United States Patent
Kodama et al.

[11] Patent Number: 5,822,105
[45] Date of Patent: Oct. 13, 1998

[54] SCANNER

[75] Inventors: Kenichi Kodama; Misako Kurihara, both of Kanagawa, Japan

[73] Assignee: Fuji Photo Film Co., Ltd., Kanagawa, Japan

[21] Appl. No.: 796,218

[22] Filed: Feb. 7, 1997

[30] Foreign Application Priority Data

Feb. 9, 1996 [JP] Japan .................................. 8-024355

[51] Int. Cl.⁶ .................................................. G02B 26/08
[52] U.S. Cl. .......................... 359/201; 359/202; 359/204; 359/216; 347/243
[58] Field of Search .................................. 359/196–197, 359/201–202, 204–206, 212, 223; 250/234–236; 347/225, 232–235, 243, 248–250, 258–261; 358/474, 475, 480, 481, 486, 296

[56] References Cited

U.S. PATENT DOCUMENTS

| | | | |
|---|---|---|---|
| 5,309,273 | 5/1994 | Mori et al. ............................... | 359/201 |
| 5,576,852 | 11/1996 | Sawada et al. .......................... | 358/475 |
| 5,610,647 | 3/1997 | Takada ..................................... | 359/204 |
| 5,646,766 | 7/1997 | Conemac ................................. | 359/204 |

*Primary Examiner*—James Phan
*Attorney, Agent, or Firm*—Sughrue, Mion, Zinn, Macpeak & Seas, PLLC

[57] ABSTRACT

A scanner is here disclosed in which the structure of an fθ lens can be simplified to decrease the cost of the scanner and facilitate the installation operation. In order to maintain the fθ properties, it is necessary to carry out control by prolonging a time interval of the radiation of light beams in the vicinity of the center of main scanning, and by shortening the time interval in the vicinity of the end portion of the main scanning so that the image formation spots of the light beams may be arranged at equal intervals. Thus, in the vicinity of the center of the main scanning, in order to prolong the time interval of the radiation, there are arranged, for example, standard radiation patterns in which the radiation is carried out once every 8 clocks, and a radiation pattern in which the radiation is done once every 9 clocks.

23 Claims, 22 Drawing Sheets

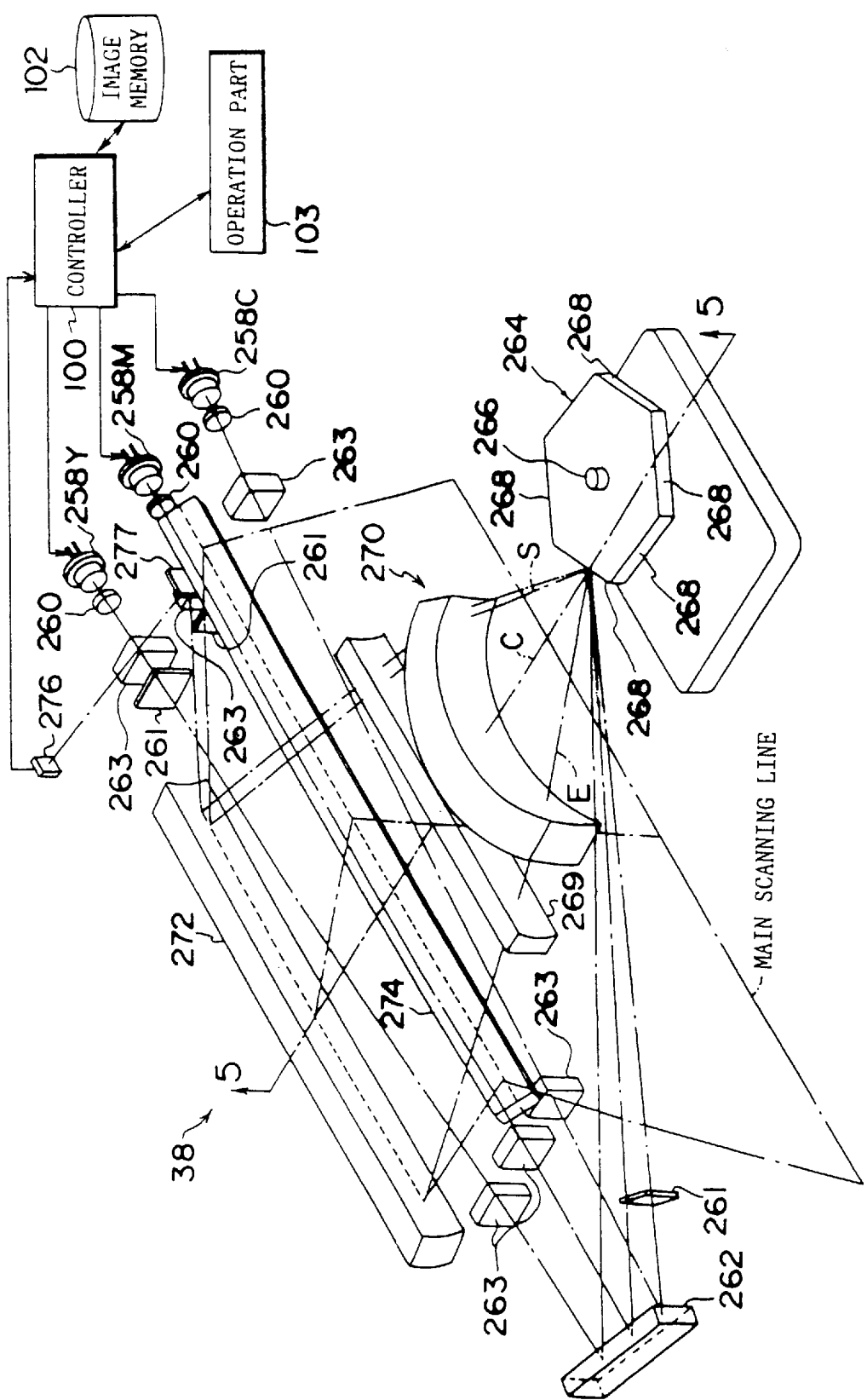

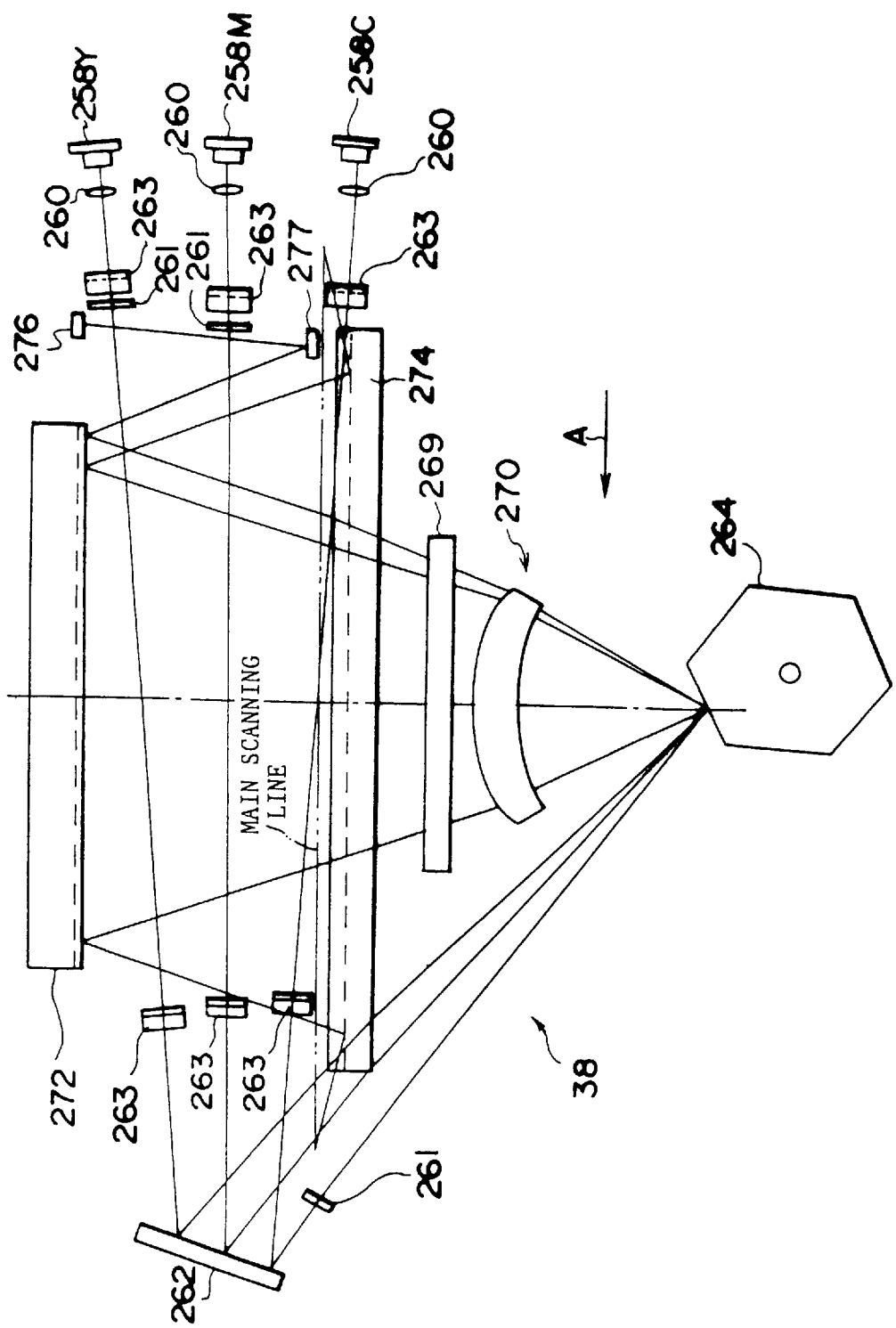

(IN BOTH ITEMS, UNIT = mm)

| SCANNING POSITION | DEVIATION |
|---|---|
| 0 | 0 |
| 7.620 | −0.318 |
| 13.970 | −0.635 |
| 41.402 | −1.778 |
| 58.674 | −2.318 |
| 81.534 | −2.794 |
| 101.219 | −2.794 |
| 113.411 | −2.540 |
| 125.603 | −2.159 |
| 139.573 | −1.461 |
| 163.957 | 0.572 |

F I G. 7
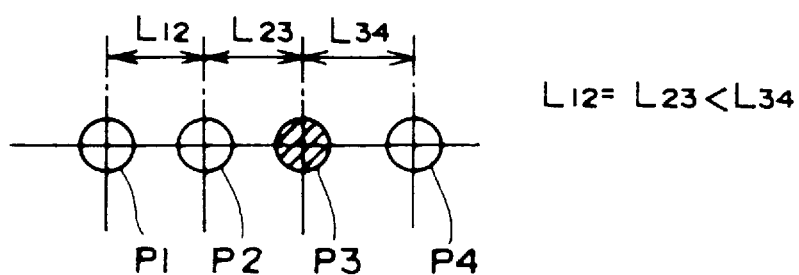

FIG. 10

RELATION BETWEEN SCANNING POSITION AND COMPENSATION PATTERN

| | SCANNING POSITION (mm) | CORRECTION PATTERN | INCLINED ANGLE |
|---|---|---|---|
| IMAGE CENTER | ~7.620 | INTRODUCE 9/8 ONCE PER 3 PIXELS | 26.6° |
| | ~13.970 | INTRODUCE 9/8 TWICE PER 5 PIXELS | 26.6° |
| | ~41.402 | INTRODUCE 9/8 ONCE PER 3 PIXELS | 26.6° |
| | ~58.674 | INTRODUCE 9/8 ONCE PER 4 PIXELS | 26.6° |
| | ~81.534 | INTRODUCE 9/8 ONCE PER 6 PIXELS | 14.0° |
| | ~101.219 | NO CORRECTION | |
| | ~113.411 | INTRODUCE 7/8 ONCE PER 6 PIXELS | 14.0° |
| | ~125.603 | INTRODUCE 7/8 ONCE PER 4 PIXELS | 26.6° |
| | ~139.573 | INTRODUCE 7/8 TWICE PER 5 PIXELS | 26.6° |
| IMAGE END | ~163.957 | INTRODUCE 7/8 TWICE PER 3 PIXELS | 26.6° |

REGION R1 / REGION R2 / REGION R3

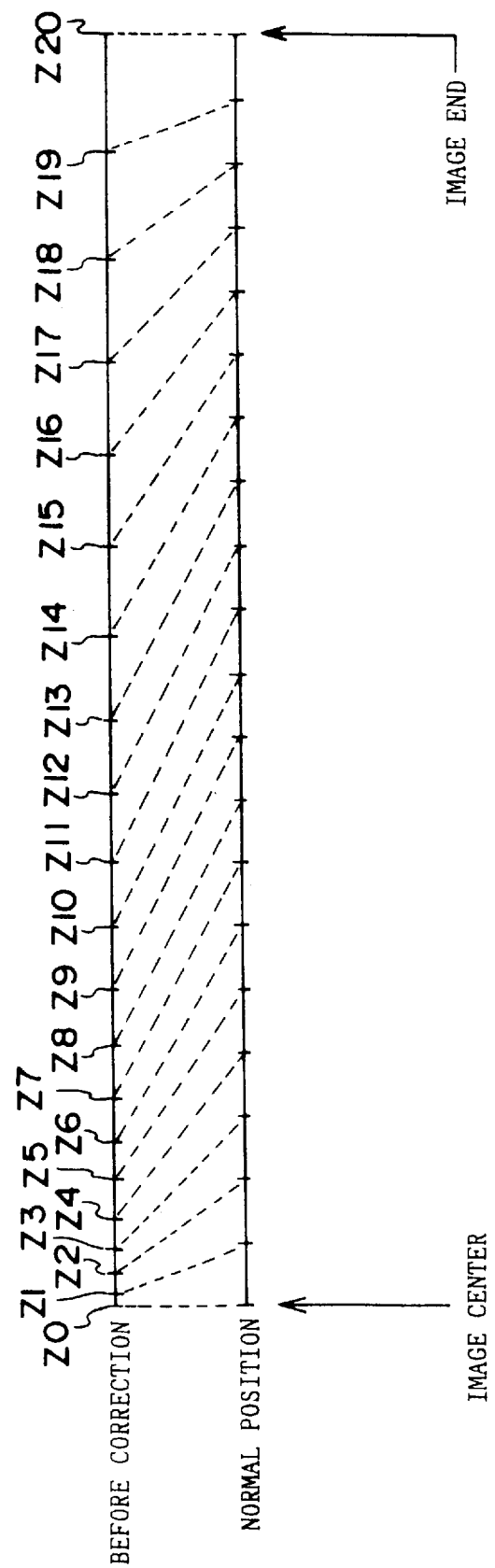

F I G. 1 2

| | POSITION BEFORE CORRECTION | NORMAL POSITION | DEVIATION OF POSITION | INTERVAL BETWEEN ADJACENT IMAGE FORMATION SPOTS | | CORRECTION OF INTERVAL |
| --- | --- | --- | --- | --- | --- | --- |
| | | | | BEFORE CORRECTION | AFTER CORRECTION | |
| Z 0 | 0 | 0 | 0 | | | |
| | | | | 0.2 | 1.0 | +0.8 |
| Z 1 | 0.2 | 1.0 | −0.8 | | | |
| | | | | 0.3 | 1.0 | +0.7 |
| Z 2 | 0.5 | 2.0 | −1.5 | | | |
| | | | | 0.4 | 1.0 | +0.6 |
| Z 3 | 0.9 | 3.0 | −2.1 | | | |
| | | | | 0.5 | 1.0 | +0.5 |
| Z 4 | 1.4 | 4.0 | −2.6 | | | |
| | | | | 0.6 | 1.0 | +0.4 |
| Z 5 | 2.0 | 5.0 | −3.0 | | | |
| | | | | 0.6 | 1.0 | +0.4 |
| Z 6 | 2.6 | 6.0 | −3.4 | | | |
| | | | | 0.7 | 1.0 | +0.3 |
| Z 7 | 3.3 | 7.0 | −3.7 | | | |
| | | | | 0.8 | 1.0 | +0.2 |
| Z 8 | 4.1 | 8.0 | −3.9 | | | |
| | | | | 0.9 | 1.0 | +0.1 |
| Z 9 | 5.0 | 9.0 | −4.0 | | | |
| | | | | 1.0 | 1.0 | 0 |
| Z 10 | 6.0 | 10.0 | −4.0 | | | |
| | | | | 1.0 | 1.0 | 0 |
| Z 11 | 7.0 | 11.0 | −4.0 | | | |
| | | | | 1.1 | 1.0 | −0.1 |
| Z 12 | 8.1 | 12.0 | −3.9 | | | |
| | | | | 1.2 | 1.0 | −0.2 |
| Z 13 | 9.3 | 13.0 | −3.7 | | | |
| | | | | 1.3 | 1.0 | −0.3 |
| Z 14 | 10.6 | 14.0 | −3.4 | | | |
| | | | | 1.4 | 1.0 | −0.4 |
| Z 15 | 12.0 | 15.0 | −3.0 | | | |
| | | | | 1.4 | 1.0 | −0.4 |
| Z 16 | 13.4 | 16.0 | −2.6 | | | |
| | | | | 1.5 | 1.0 | −0.5 |
| Z 17 | 14.9 | 17.0 | −2.1 | | | |
| | | | | 1.6 | 1.0 | −0.6 |
| Z 18 | 16.5 | 18.0 | −1.5 | | | |
| | | | | 1.7 | 1.0 | −0.7 |
| Z 19 | 18.2 | 19.0 | −0.8 | | | |
| | | | | 1.8 | 1.0 | −0.8 |
| Z 20 | 20.0 | 20.0 | 0 | | | |

F I G. 2 1
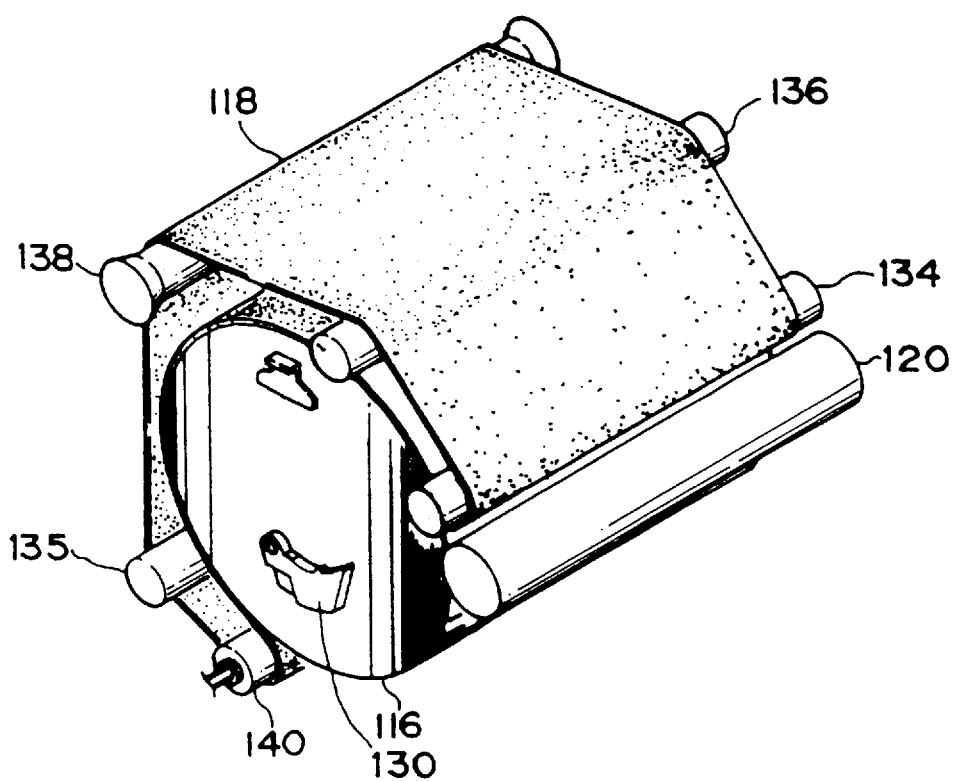

F I G. 2 2
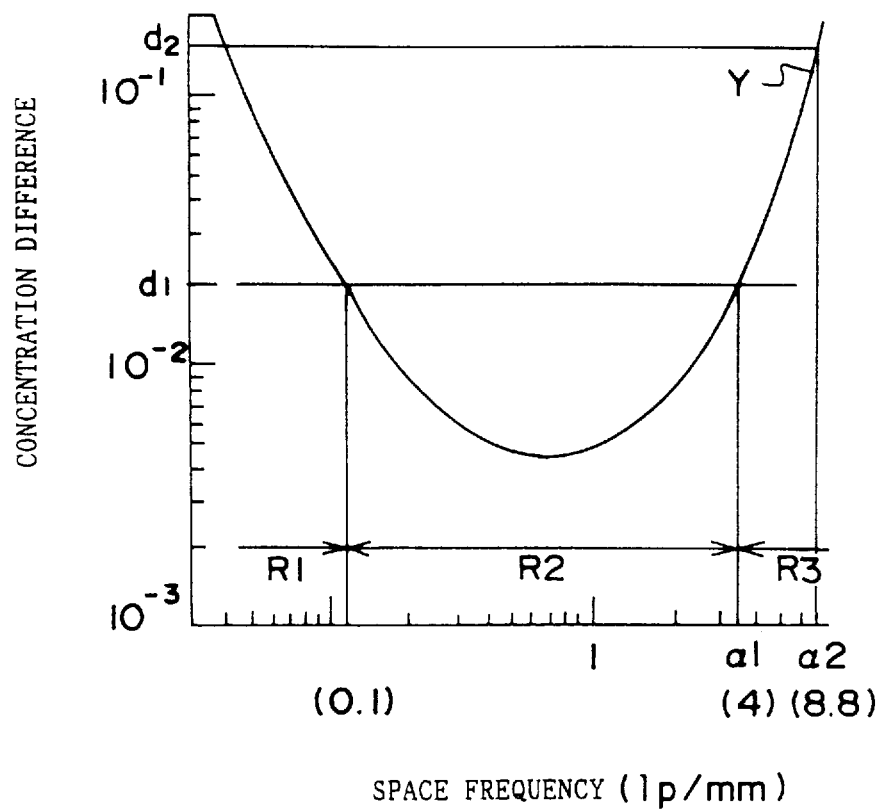

SCANNER

BACKGROUND OF THE INVENTION

1. Field of the Invention

The present invention relates to a scanner, and more specifically, it relates to a scanner comprising a main scanning means for carrying out a main scanning by deflecting a light beam radiated from a light source so that a deflection angle may change in a predetermined range, an optical system for focusing, on a surface to be scanned, the light beam deflected by the main scanning means, and an auxiliary scanning means for moving, in a direction vertical to a main scanning direction, a relative position between an image formation spot of the light beam focused by the optical system and the surface to be scanned.

2. Description of the Related Art

Heretofore, there is known an image exposure device in which a photosensitive material is scanned and exposed by the use of a rotatable deflector such as a polygon mirror. In this image exposure device, an emission time and an emission intensity of a light source (e.g., a semiconductor laser) can be controlled so as to correspond to the image to be recorded, and an image can be formed on the surface of the photosensitive material by the use of a light beam radiated from the light source through a predetermined optical system to form an image formation spot. Furthermore, the image is exposed on the photosensitive material by moving a relative position between the image formation spot and the photosensitive material along an auxiliary scanning direction, while the image formation spot is scanned on the surface of the photosensitive material by the above-mentioned deflector arranged in a light path.

In the case that the image formation spot of the light beam is scanned in the main scanning direction on the surface of the photosensitive material by the rotation at a conformal rate of the deflector arranged in the light path as described above. An fθ lens is arranged between the deflector and the photosensitive material so that the image formation spot by the light beam reflected off the deflector may be scanned in the main scanning direction at an equal speed on the surface of the photosensitive material.

Furthermore, an image reader is also known in which a record surface on which an image has been recorded is scanned by the light beam in a scanning mechanism similar to the above-mentioned image exposure device to read the image by a transmitted light which has transmitted through the record surface, whereby the image recorded on the record surface can be read.

In addition, in order to expose a color image, it is known a technique that the above-mentioned image exposure device is equipped with 3 semiconductor lasers for radiating three colors, e.g., a light beam for a cyan color (emission wavelength 750 nm), a light beam for a magenta color (emission wavelength 680 nm) and a light beam for a yellow color (emission wavelength 810 nm) from the light sources of the three colors, respectively, whereby the surface of the photosensitive material can be simultaneously exposed by the use of the light beams from the semiconductor lasers of these three colors.

However, when the light beams having the different wavelengths are used, the image formation spots of the respective light beams deviate in a main scanning direction on the surface of the photosensitive material, because the refractive indexes of the respective light beams at the time from the transmission of the fθ lens are different from one another. In consequence, there is a problem that the quality of the exposed image deteriorates.

Thus, a plurality of lenses having predetermined refractive indexes and dispersion properties are arranged in the radiation directions of the light beams to constitute the fθ lens, and while a function of moving the image formation spot of the above-mentioned light beam at the equal speed on the photosensitive material is maintained by such an fθ lens, the light beams having the different wavelengths are converged so as not to deviate in the main scanning direction on the surface of the photosensitive material, whereby the quality deterioration of the exposed image can be prevented.

However, the fθ lens having the above-mentioned characteristics requires a plurality of expensive lenses, and in addition, it is necessary to accurately arrange the plurality of lenses at precise intervals in the radiation directions of the light beams. Therefore, the operation of installing the image exposure device is very complex and troublesome.

SUMMARY OF THE INVENTION

The present invention has been developed under the above-mentioned circumstances, and an object of the present invention is to provide a scanner in which the structure of an fθ lens can be simplified to decrease a cost and an installing operation can easily be carried out.

According to the first aspect of the present invention, there is provided a scanner which comprises a main scanning means for carrying out a main scanning by deflecting a light beam radiated from a light source so that a deflection angle may change in a predetermined range, an optical system for focusing, on a surface to be scanned, the light beam deflected by the main scanning means, an auxiliary scanning means for moving, in a direction vertical to a main scanning direction, a relative position between an image formation spot of the light beam focused by the optical system and the surface to be scanned, and a light source control means for controlling the radiation timing of the light beam by the light source so that the image formation spots, on the surface to be scanned, by the light beam deflected by the main scanning means may be at equal intervals in a main scanning direction.

In the first aspect of the present invention, the light beam radiated from the light source is deflected by the main scanning means so that the deflection angle may change in the predetermined range, and the thus deflected light beam is focused on the surface to be scanned by the optical system in the main scanning direction.

Furthermore, the radiation timing of the light beam by the light source is controlled by the light source control means so that the image formation spots on the surface to be scanned by the deflected light beam may be at equal intervals.

On the other hand, the relative position between the image formation spot of the light beam by which the image is formed and the surface to be scanned is moved in the direction (the auxiliary scanning direction) vertical to the main scanning direction by the auxiliary scanning means, so that the surface to be scanned can be regularly scanned by the image formation spots together with the main scanning at the above-mentioned equal intervals.

Therefore, it is not necessary any more that in order to move the image formation spot by the light beam at the equal speed on the surface to be scanned as in the conventional case, the plurality of lenses having the predetermined refractive indexes and dispersion properties are accurately arranged in the radiation directions of the light beams to constitute the fθ lens.

That is to say, according to the first aspect of the present invention, the structure of the fθ lens can be simplified to decrease the cost, and the installing operation of the fθ lens can easily be carried out.

In addition, the scanner of the present invention can be applied to an image exposure device in which the image is exposed on the photosensitive material. In this case, the continuous emission time and the emission intensity of the light source are controlled so as to correspond to the image to be exposed, whereby the light beam radiated from the light source is focused on the photosensitive material as the surface to be scanned, and its image formation spot is scanned on the photosensitive material. Moreover, for example, the scanner of the present invention can be applied to an image reader in which the image by a transmitted light which the record surface has transmitted is read, and in this case that the light beam radiated from the light source is focused on an image record surface as the surface to be scanned and its image formation spot is scanned on the image record surface.

Furthermore, when the relative position between the image formation spot of the light beam and the surface to be scanned is moved in the auxiliary scanning direction, the auxiliary scanning means may move either of the image formation spot and the surface to be scanned.

In this connection, the above-mentioned light source control means can control the radiation timing of the light beam so that the image formation spots on the surface to be scanned by the deflected light beam may be arranged at the equal intervals in the main scanning direction, and therefore the scanner can be constituted as the second aspect or the fourth aspect of the present invention.

In a scanner according to the second aspect of the present invention, the light source control means in the scanner of the first aspect of the present invention has a clock generation means for generating a clock having a predetermined frequency, a radiation control means for radiating the light beam from the light source every predetermined count value previously decided in the clock generated by the clock generation means, and a frequency control means for changing the frequency of the clock every step previously decided at the time of the deflection by the above-mentioned main scanning means.

In the second aspect of the present invention, the clock is generated from the clock generation means, and the radiation control means radiates the light beam from the light source every predetermined count value previously decided.

Here, the frequency of the clock is changed at the time of the deflection every previously decided step by the frequency control means so that the positions of the image formation spots on the surface to be scanned by the light beam may be at the equal intervals in the main scanning direction.

If the count value is constant, the radiation timing of the light beam fluctuates in compliance with the change of the clock frequency. For example, in a time chart shown in FIG. 14, a time interval $T_{23}$ of a 8 clock in the case that the clock frequency is lowered is longer than time intervals $T_{12}$, $T_{34}$ of the 8 clock at a usual clock frequency. That is to say, by lowering the clock frequency, the radiation timing can be delayed and the interval between the image formation spots can be prolonged. On the other hand, by heightening the clock frequency, the radiation timing can be quickened and the interval between the image formation spots can be shortened.

In this connection, in the case that the frequency is not changed (not corrected), the interval between the image formation spots is shorter in the vicinity of the center of the scanning, and it is longer in the vicinity of the end portion of the scanning. Thus, in order to form equal intervals between the positions of the image formation spots in the main scanning direction, the frequency control means can increase the clock frequency in the vicinity of the end portion of the scanning to shorten the interval between the image formation spots and can lower the clock frequency in the vicinity of the center of the scanning to prolong the interval between the image formation spots.

With regard to the steps of the frequency which can be changed by the frequency control means, when they are constituted of many finer steps, the accuracy of the frequency control can be improved. In addition, an optimum clock frequency may be calculated and set in compliance with the position of the image formation spot in the main scanning direction, though its detail will be described in the second embodiment. Concretely, the clock frequency at the position of the image formation spot may be set so that a ratio between the clock frequency at the central main scanning position and the clock frequency at the position of the image formation spot may be equal to a ratio of the scanning speed before the correction.

On the other hand, in a scanner according to the fourth aspect of the present invention, the light source control means in the scanner of the first aspect of the present invention has a clock generation means for generating a clock having a predetermined frequency, a radiation control means for radiating the light beam from the light source every predetermined count value previously decided in the clock generated by the clock generation means, and a count value correction means for correcting a count value in the radiation control means every step previously decided at the time of the deflection by the main scanning means.

In this fourth aspect of the present invention, the clock is generated from the clock generation means, and the radiation control means radiates the light beam from the light source every predetermined count value previously decided.

Here, the count value can be corrected every previously decided step at the time of the deflection by the count value correction means so that the positions of the image formation spots on the surface to be scanned by the light beam may be at the equal intervals in the main scanning direction.

In the case that the frequency of the clock is constant, the radiation timing of the light beam fluctuates in compliance with the change of the count value. For example, in a time chart shown in FIG. 6, a time interval $T_9$ in the case that 8 which is the usual count value is changed to 9 is longer than a usual time interval $T_8$.

That is to say, by increasing the count value, the radiation timing can be delayed and the interval between the image formation spots can be prolonged. On the contrary, by decreasing the count value, the radiation timing can be quickened and the interval between the image formation spots can be shortened.

In this connection, in the case that the count value is not corrected, the interval between the image formation spots is shorter in the vicinity of the center of the scanning, and it is longer in the vicinity of the end portion of the scanning. For example, FIG. 11 shows the positions of the image formation spots before the correction in the case that an image center Z0 to an image end portion Z20 are scanned by 20 image formation spots, and positions which should be present in the case that the same number (20) of the image formation spots are uniformly arranged. Moreover, FIG. 12 shows a correspondence between the positions of the image formation spots before the correction in FIG. 11 and the positions which should be present, and deviations thereof, the values before the correction and the values after the correction regarding the interval between the adjacent image formation spots, and the corrections of the intervals which should be corrected.

In FIG. 11, the distance from the image center Z0 to an image end portion Z20 is set at 20.0 mm, and the image formation spot in FIG. 12 is a position (unit: mm) along an axis in which the image center Z0 is an origin and the direction toward the image center Z0 is positive.

As is apparent from the table of this FIG. 12, in order to carry out the control so that the image formation spots may be arranged at equal intervals, it is necessary that the correction in the vicinity of the center of the scanning is made so that the interval between the image formation spots may be large, and the correction in the vicinity of the end portion of the scanning is made so that the interval between the image formation spots may be small.

As described above, in the vicinity of the center of the scanning, the correction is made so that the interval between the image formation spots may be large, and in the vicinity of the end portion of the scanning, the correction is made so that the interval between the image formation spots may be small. Therefore, the scanner can be constituted as the third aspect or the fifth aspect of the present invention.

In the third aspect of the present invention, the frequency control means in the second aspect of the present invention alters the frequency of the clock on the basis of a difference between the position of the image formation spot in the case that the image formation spots in the same number as before the change of the frequency are arranged uniformly along the main scanning direction and a position of the image formation spot before the change of the frequency.

In this third aspect of the present invention, in order to carry out the control so that the image formation spots may be arranged at equal intervals in the range from the center of the scanning to the end portion of the scanning, the image formation spots in about the same number as the number of the image formation spots in the case that the scanning is done from the center of the scanning to the end portion of the scanning before the change of the frequency are uniformly arranged along the main scanning direction, and on the basis of a difference between the position of the image formation spot in the case of this arrangement and the position of the image formation spot before the change of the frequency, the frequency of the clock is changed. That is to say, in the vicinity of the center of the scanning, the frequency of the clock is lowered, whereby the radiation timing can be delayed and the interval between the image formation spots can be prolonged, and in the vicinity of the end portion of the scanning, the frequency of the clock is increased, whereby the radiation timing can be quickened and the interval between the image formation spots can be shortened.

In this way, the clock frequency can be properly changed in accordance with the scanning position.

In the third aspect of the present invention, the clock frequency which is a standard (standard clock frequency) is previously decided, and in general, the control may be carried out so that the clock may be generated at this standard clock frequency to increase/decrease the standard clock frequency at a predetermined timing.

Furthermore, by changing a frequency of increasing/ decreasing the standard clock frequency, a correction degree of the interval between the image formation spots may be regulated. For example, in the table in FIG. 12, in the vicinity of the scanning center Z0 and the scanning end portion Z20, the corrections of the intervals are large, and therefore in the vicinity of the scanning center Z0, the frequency of decreasing the standard clock frequency is increased, and in the vicinity of the scanning end portion Z20, the frequency of increasing the standard clock frequency is heightened. On the other hand, in the vicinity of the image formation spots Z9, Z10 and Z11, the correction of the interval is small, and therefore the control is carried out so as to lower the frequency of increasing/decreasing the standard clock frequency, or so as not to increase/decrease it.

On the other hand, in the fifth aspect of the present invention, the count value correction means in the fourth aspect of the present invention corrects a count value on the basis of a difference between the position of the image formation spot in the case that the image formation spots in the same number as before the correction of the count value are arranged uniformly along the main scanning direction and the position of the image formation spot before the correction of the count value.

In the fifth aspect of the present invention, the control regarding the increase/decrease of the clock frequency in the third aspect of the present invention is applied to the control regarding the correction of the count value. That is to say, in the vicinity of the center of the scanning, the correction is made so that the count value may be increased, whereby the radiation timing can be delayed and the interval between the image formation spots can be prolonged, and in the vicinity of the end portion of the scanning, the correction is made to decrease the count value, whereby the radiation timing can be quickened and the interval between the image formation spots can be shortened.

In this way, the count value can properly be corrected in accordance with the scanning position.

In this connection, in the fifth aspect of the present invention, the count value which is a standard (standard count value) is previously decided, and in general, the light beam may be radiated at the standard count value. Next, the standard count value may be corrected at a predetermined timing as described above, and the control may be made so as to radiate the light beam at the corrected count value.

Furthermore, by changing the frequency of correcting the standard count value, a correction degree of the interval between the image formation spots may be regulated. For example, in the table in FIG. 12, in the vicinity of the scanning center Z0 and the scanning end portion Z20, the corrections of the intervals are large, and therefore in the vicinity of the scanning center Z0, the frequency of increasing the standard count value is increased, and in the vicinity of the scanning end portion Z20, the frequency of decreasing the standard count value is increased. On the other hand, in the vicinity of the image formation spots Z9, Z10 and Z11, the correction of the interval is small, and therefore the control is carried out so as to lower the frequency of correcting the standard count value, or so as not to do the correction.

In this connection, since the corrected image formation spot is an image formation spot by the light beam radiated at the timing when the standard clock count number is increased, the interval between the corrected image formation spot and the usual image formation spot is different from the interval between the usual image formation spots by the light beams radiated at the timing when the standard clock count number is present as it is. Therefore, owing to this fact, for example, as shown in FIG. 15, in the case that the corrected image formation spot (in the drawing, a spot represented by a black circle) every main scanning line is continuously positioned in the auxiliary scanning direction, a scanning unevenness of the surface to be scanned takes place in a line (hereinafter referred to as "the corrected image formation spot line") by the corrected image formation spots. In the case that the scanner of the present invention is applied to, for example, an image exposure device, the scanning unevenness is observed as an exposure unevenness, which might lead to the deterioration of an image quality. Incidentally, in FIGS. 15 to 19, the spots represented by the black circles mean the corrected image formation spots, and the spots represented by the white circles mean the image formation spots of the light beams radiated at a non-corrected timing.

Thus, in the sixth aspect of the present invention, the frequency control means in the second aspect of the present invention changes the frequency of the clock so that the frequency-corrected image formation spots as the image formation spots by the light beams radiated at the timing when the frequency of the clock is changed may not be continuously arranged in the auxiliary scanning direction.

Furthermore, in the seventh aspect of the present invention, the frequency control means in the sixth aspect of the present invention changes the frequency of the clock so that a line by the frequency-corrected image formation spots continuously arranged may incline at an angle of 45° or more to the auxiliary scanning direction.

On the other hand, with regard to the correction of the count value, in the eighth aspect of the present invention, the count value correction means in the fourth aspect of the present invention corrects the count value so that the count value-corrected image formation spots as the image formation spots by the light beams radiated at the timing when the count value is corrected may not be continuously arranged in the auxiliary scanning direction.

Furthermore, in the ninth aspect of the present invention, the count value correction means in the eighth aspect of the present invention corrects the count value so that a line by the count value-corrected image formation spots continuously arranged may incline at an angle of 45° or more to the auxiliary scanning direction.

In the sixth aspect of the present invention, it is required to avoid the continuous arrangement of the frequency-corrected image formation spots in the auxiliary scanning direction. Hence, the frequency-corrected image formation spots may be arranged at random, or may be continuously arranged in a direction other than the auxiliary scanning direction (e.g., an oblique direction).

Similarly, also in the eighth aspect of the present invention, it is required to avoid the continuous arrangement of the count value-corrected image formation spots in the auxiliary scanning direction. Hence, the count value-corrected image formation spots may be arranged at random, or may be continuously arranged in a direction other than the auxiliary scanning direction (e.g., an oblique direction).

In this connection, the positions of the image formation spots are slightly corrected at the frequency-corrected image formation spots (or the count value-corrected image formation spots), but they are secondarily arranged in order substantially along the main scanning direction and the auxiliary scanning direction.

It is known that even if the frequency-corrected image formation spots (or the count value-corrected image formation spots) are arranged in a predetermined direction (e.g., the oblique direction), visual distinctness deteriorates when each space between the lines by the frequency-corrected image formation spots (or the count value-corrected image formation spots) is small.

Thus, in the above-mentioned arrangement of the image formation spots, as in the seventh aspect of the present invention, by changing the frequency of the clock so that the line by the frequency-corrected image formation spots may incline at an angle of 45° or more to the auxiliary scanning direction, it can be avoided by the utilization of a visual effect that a positional deviation at the frequency-corrected image formation spots is visually observed.

Similarly, as in the ninth aspect of the present invention, by changing the count value so that the line by the count value-corrected image formation spots may incline at an angle of 45° or more to the auxiliary scanning direction, it can be avoided by the utilization of the visual effect that a positional deviation at the count value-corrected image formation spots is visually observed.

In order to improve the effect of lowering the visual distinctness, it is effective to decrease the space between the lines by the frequency-corrected image formation spots (or the count value-corrected image formation spots) so that the lines by the frequency-corrected image formation spots (or the count value-corrected image formation spots) may incline at a larger angle to the auxiliary scanning direction.

In this connection, the present invention can be applied to not only a scanner for scanning the surface to be scanned by the light beam from one light source but also another scanner for scanning the surface to be scanned by the light beams having different light beams radiated from the plural light sources.

As the invention which can be applied to the above-mentioned scanner, there is provided a scanner according to the tenth aspect of the present invention. In the scanner of the tenth aspect, a plurality of light sources are arranged in any scanner of the first to ninth aspects described above, and the light source control means controls the radiation timings of the respective light beams so that the image formation spots, on a surface to be scanned, of each of the light beams having the different wavelengths radiated from the respective light sources may be arranged at equal intervals in the main scanning direction and so that the spaces between the image formation spots may coincide with one another between the respective light beams.

Furthermore, in the eleventh aspect of the present invention, the light source control means in the scanner of the tenth aspect controls the radiation timings of the respective light beams so that the positions of the first image formation spots of the respective light beams in one main scanning may coincide with one another on the surface to be scanned.

In the scanner of the tenth aspect, the light source control means controls the radiation timings of the light beams so that the image formation spots of each of the light beams having the different wavelengths on the surface to be scanned may be arranged at equal intervals in the main scanning direction, as in the first aspect of the present invention. In addition, the light source control means controls the radiation timings of the respective light beams so that the spaces between the image formation spots may be uniform between the light beams.

In consequence, the image formation spots of each of the light beams on the surface to be scanned are arranged at the equal intervals in the main scanning direction, and the intervals between the image formation spots are uniform between the respective light beams without any unevenness between the light beams themselves having the different wavelengths. That is to say, by controlling the radiation timings of the respective light beams, the so-called fθ properties correction and a color compensation (an achromatization) can be simultaneously electrically accomplished.

Therefore, it is not necessary any more that in order to carry out the fθ properties correction and the color compensation (the achromatization) as in the conventional case, the plurality of lenses having the predetermined refractive indexes and dispersion properties are accurately arranged in the radiation directions of the light beams to constitute the fθ lens.

That is to say, according to the tenth aspect of the present invention, in the scanner for scanning the surface to be scanned by the light beams having the different wavelengths radiated from the plurality of light sources, the structure of the fθ lens can be simplified to decrease a cost, and the installing operation of the fθ lens can easily be carried out.

Furthermore, in the tenth aspect of the present invention, as in the eleventh aspect of the present invention, when the light source control means controls the radiation timings of the respective light beams so that the positions of the first image formation spots of the respective light beams in one main scanning may concide on the surface to be scanned, the fθ properties correction and the color compensation (the achromatization) can be accomplished as described above, and simultaneously, the positions of the image formation spots of the respective light beams can be conformed to each other in the main scanning direction.

In fact, in the case that the incident angles of the respective light beams to the main scanning means are different, the image formation spots of the respective light beams are not arranged simultaneously at the same position in the main scanning direction, but when the radiation timings of the respective light beams are controlled so that the positions of the first image formation spots of the respective light beams in one main scanning may coincide on the surface to be scanned as described above, the respective light beams can form the image at the same position on the surface to be scanned, though the timings of the image formation deviate.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 3 is a schematic perspective view of the exposure device.

FIG. 4 is a schematic view of the exposure device as seen from its vertical upper side.

FIG. 7 is an illustrative view of a difference of intervals between image formation spots by the "Introduce 9/8" compensation.

FIG. 10 is a table showing a correspondence of a scanning position to a compensation pattern at the scanning position.

FIG. 11 shows one embodiment of an arrangement of image formation positions before the correction and image formation positions which should be normally present, in the case that a predetermined number of the image formation spots are uniformly spaced in a main scanning direction.

FIG. 12 is a table in which the deviations of the positions of the respective image formation spots and the corrections of intervals between the adjacent image formation spots are shown.

FIG. 21 is a perspective view showing the heating drum, rollers and the like on its periphery.

FIG. 22 is a diagram showing space frequency-concentration difference properties as data regarding visual distinctness.

DESCRIPTION OF THE PREFERRED EMBODIMENTS

Embodiment 1

A first embodiment of the present invention will now be described in detail with reference to the accompanying drawings.

Figure 1:
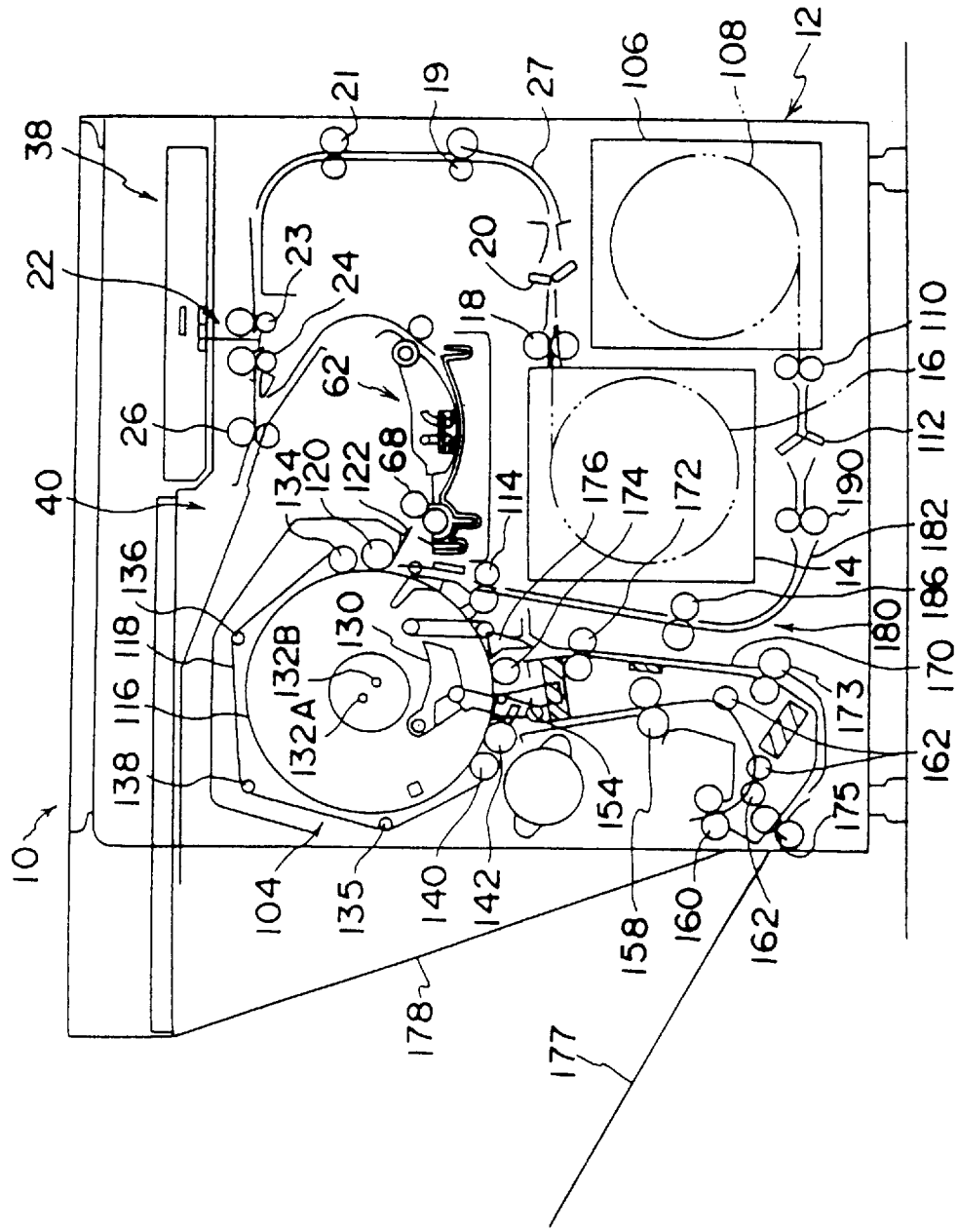
FIG. 1 is a schematic whole constitutional view of an image recording device in which an exposure device regarding the present invention is installed.
Figure 2:
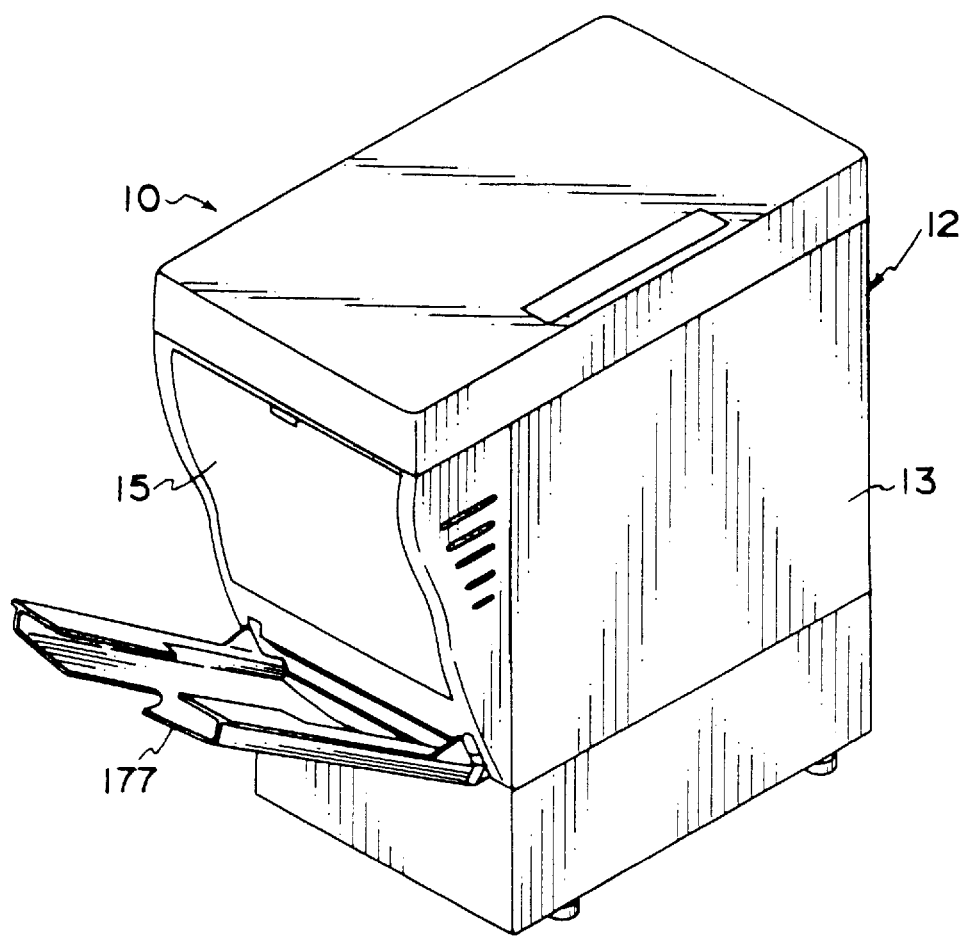
FIG. 2 is a perspective view showing an appearance of the image recording device.

FIG. 1 schematically illustrates the configuration of an image recording device 10, in which the exposure device 38 of the invention is incorporated. FIG. 2 illustrates the appearance of this image recording device 10.

Referring to FIG. 2, the image recording device 10 is formed in a box shape as a whole, and front and side doors 13 and 15 are attached to a machine base 12. The inside of the machine base 12 can be exposed by opening each door.

Referring to FIG. 1, a photosensitive material magazine 14 is arranged in the machine base 12 of the image recording device 10, and a photosensitive material recording medium 16 is housed, being wound in a rolled form. This photosensitive material 16 is wound so that its photosensitive (exposure) surface is inside. Any one of photosensitive materials 16 may be selected, irrespective of negative and otherwise positive images it provides during exposure.

A nip roller 18 and a cutter 20 are arranged in the vicinity of the take-out port of the photosensitive material of the photosensitive magazine 14, and the photosensitive material 16 can be cut after having been pulled out of the photosensitive magazine 14 by a specified length.

Plural pairs of carrier rollers 19, 21, 23, 24 and 26 and a guiding plate 27 are arranged in the side of the cutter 20. These can carry the photosensitive material 16 cut to a specified length to an exposing part 22.

The exposing part 22 is positioned between the carrier roller 23 and the carrier roller 24, creating an exposing portion (exposing point) between these rollers, through which the photosensitive material 16 passes. Thus, the photosensitive material 16 is carried along an auxiliary scanning direction by these carrier rollers 23 and 24.

The exposure device 38 is installed on the top of the exposing part 22. As shown in FIGS. 3 and 4, the exposure device 38 is provided with a semiconductor laser 258C (light emission wavelength of 750 nm) as a light source for developing a cyan color, a semiconductor laser 258M (light emission wavelength of 680 nm) as a light source for developing a magenta color and a semiconductor laser 258Y (light emission wavelength of 810 nm) as a light source for developing a yellow color.

Referring to FIG. 3, a controller 100 for controlling a light beam emission timing from each semiconductor laser, emission duration and light intensity is connected to each of these semiconductor lasers 258C, 258M and 258Y. There are connected to the controller 100 an image memory 102 for storing image data to be exposed and an operation part 103 composed of a keyboard, a button, etc., not shown, which an operator uses to specify image data to be exposed and instruct starting/stopping, etc., of exposure processing.

The controller 100 includes a microcomputer, not shown. By means of this microcomputer, the controller 100 reads the image data specified by the operator through the operation part 103 from the image memory 102 and controls a current supplied to each of the semiconductor lasers 258C, 258M and 258Y so as to emit a light beam based on the image data with proper emission duration, light intensity and a later-described emission timing.

Figure 13:
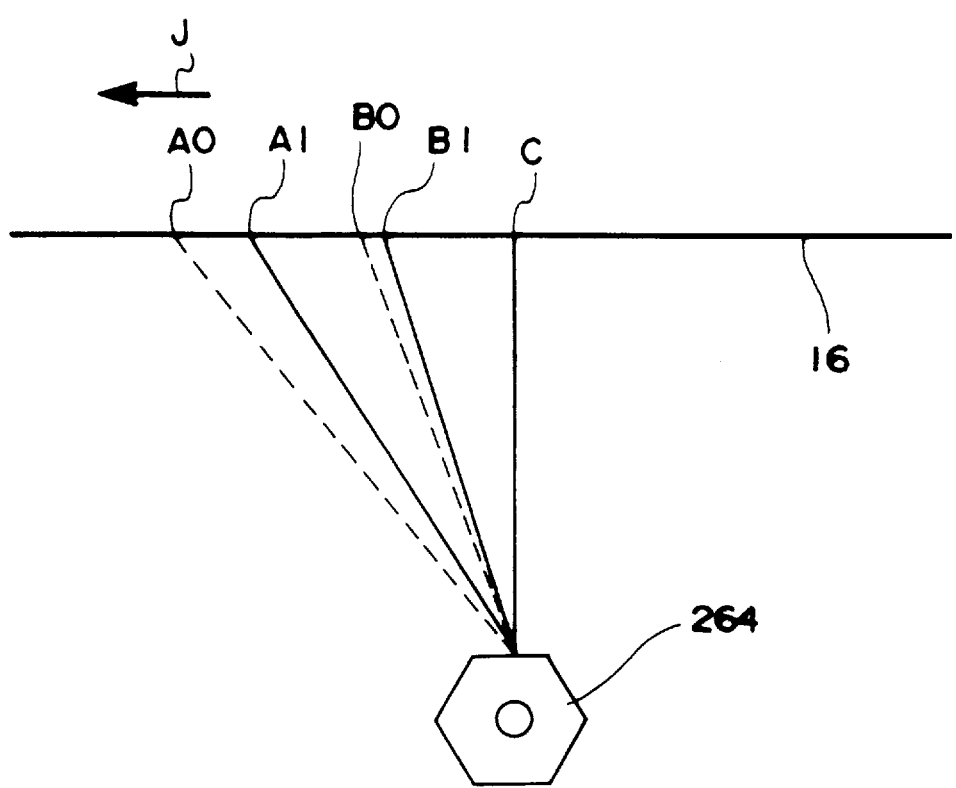
FIG. 13 shows the positions of the image formation spots before the correction and after the correction for maintaining fθ properties.
Figure 14:
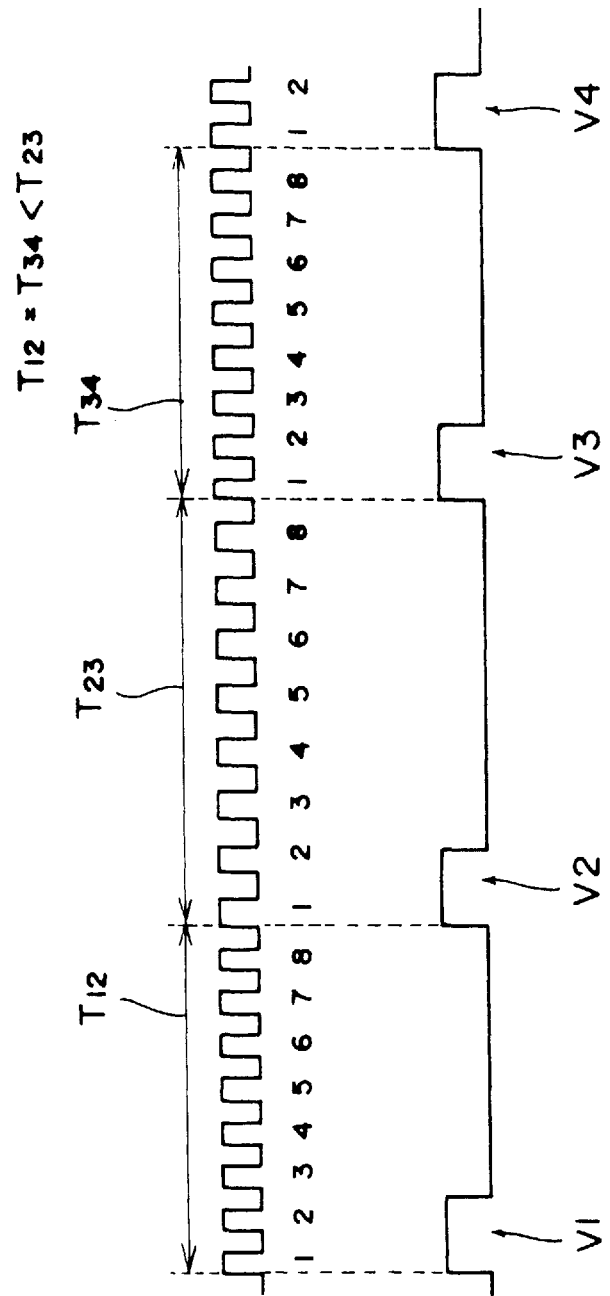
FIG. 14 is a time chart showing a correspondence between a clock in a correction pattern for changing a frequency and the radiation timing of the light beams.

Since the polygon mirror 264 rotates at a constant angular speed, a light beam deflected off a mirror surface 268 of the polygon mirror will also travel at the same constant angular speed, and, if left uncorrected, will traverse the recording medium in the main scanning direction at different linear speeds, thereby forming image spots at unequal intervals as shown in FIG. 13. In the present invention, however, the controller 100 controls a light beam exit timing to compensate for the different speed at which the light beam traverses the recording medium, so that image formation spots on the surface of the photosensitive material 16 by the deflected light beams may be at equal intervals in a main scanning direction. In other words, in order to realize a function conventionally performed by an fθ lens for moving image formation spots on the photosensitive material 16 surface by deflected light beams at equal speeds, the controller 100 utilizes an electrical method, by means of which it controls a light beam emission timing so that image formation spots are at equal intervals in the main scanning direction.

The controller 100 also controls an emission timing for each semiconductor laser so that the intervals of image formation spots by a light beam from each semiconductor laser are the same as those of spots by the other light beams. Consequently, in order to converge light beams having different refractive indexes on the surface of the photosensitive material 16, it is not necessary to array a plurality of lenses having specified refractive index/dispersion characteristics in a light beam emission direction with high assembling accuracy.

Furthermore, the controller 100 is also connected to a later-described photosensitive material carrier system and an image receiving material carrier system through a signal line, not shown. The controller 100 performs control so as to obtain synchronization between a timing for carrying the photosensitive material 16 and an image receiving material 108 (see FIG. 1) and an emission timing for a light beam from each of the foregoing semiconductor lasers.

On the other hand, a collimator lens 260 for converting a diffused light beam from each of the semiconductor lasers 258C, 258M and 258Y into a parallel light beam is provided in the vicinity of the exit side of each of the semiconductor lasers 258C, 258M and 258Y. Each light beam converted into a parallel light beam through the collimator lens 260 is made incident on a reflection mirror 262 through a cylindrical lens group 263 and a light quantity adjusting filter 261, reflected by the reflection mirror 262, and converged on the reflection mirror 268 of a polygon mirror 264. The cylindrical lens 263 serves to shape a light beam in the auxiliary scanning direction.

Furthermore, the polygon mirror 264 has six reflection areas 268, rotates around a shaft 266 at a high speed by a driving force from a motor, not shown, and serves to continuously change and deflect the incident angle of a light beam to each reflection area 268. That is to say, the polygon mirror 264 deflects each light beam and causes this to scan along the main scanning direction. In the first embodiment, the number of rotations for the polygon mirror 264 is set to, for instance 125 per second.

In the advancing direction of a light beam deflected by the polygon mirror 264, there is provided an image surface position correcting lens 270, which causes the deflected light beam to form an image at a specified beam spot on the photosensitive material 16 of the exposing part 22. This image surface position correcting lens 270 has only a function for correcting the curvature of an image surface with respect to the deflected light beam. It is not provided with functions for moving image formation spots by the deflected light beam on the surface of the photosensitive material 16 at equal intervals and for moving these at equal intervals among colors. As described above, the functions for moving image formation spots on the photosensitive material 16 surface at equal intervals and for moving these at equal intervals among colors are realized by means of the electrical control method of the controller 100.

Thus, according to the first embodiment, since the image surface position correcting lens 270 is not provided with the functions for moving the image formation spots by the deflected light beam on the photosensitive material 16 surface at equal intervals and for moving these at equal intervals among colors, the structure of the lens is simple, which enables costs to be reduced and device assembling work to be simplified.

A cylindrical lens 269 and a cylindrical mirror 272 are provided in sequence in the advancing direction of the light beam, which has passed through the foregoing image surface position correcting lens 270. A reflection mirror 274 is provided in the advancing direction of the light beam reflected by the cylindrical mirror 272. The light beam reflected by the reflection mirror 274 is reflected in an approximately vertical downward direction, forming an image on the photosensitive material 16 placed in the exposing part 22.

In the side of the reflection mirror 274, there is provided a SOS (start of scanning) mirror 277, which is first irradiated with the light beam reflected by the polygon mirror 264. In the SOS mirror 277, the light beam used for first irradiation (light beam corresponding to the vicinity of a main scan starting spot) is reflected and made incident on a SOS sensor 276. After the light beam has been made incident from the SOS mirror 277, the SOS sensor 276 outputs a specified signal, which is then input to the controller 100. The controller 100 controls a main scanning start time by each light beam, that is to say, an emission start timing for a light beam from each semiconductor laser 258x, so that the positions of first image formation spots by light beams coincide with one another on the photosensitive material 16 during one main scanning.

When controlling the light beam exit start timing, the controller 100 also gives consideration to relative positional shifts among the semiconductor lasers 258x.

Referring back to FIG. 1, a switch back part 40 is provided in the side of the exposing part 22, and a water applying part 62 is provided in the lower side of the same. The photosensitive material 16 exposed in the exposing part 22 is first sent to the switch back part 40, and then sent through a carrying path provided in the lower part of the exposing part 22 to the water applying part 62 by means of reverse rotation of the carrier roller 26. A plurality of pipes are connected to the water applying part 62, thereby enabling water to be supplied. In the side of the water applying part 62, there is arranged a heat developable transferring part 104, to which the photosensitive material 16 with water applied is sent.

The foregoing water is not limited to pure water, but includes water used in wide and customary sense of the word. For this water, a mixed solvent between pure water and a low boiling spot solvent selected from DMF, acetone, diisobutyl ketone, etc., may be used. Alternatively, a solvent containing an image formation accelerator, a fog preventing agent, a development stopping agent, a hydrophilic heat solvent, etc., may be used.

On the other hand, in the machine base 12 in the side of the photosensitive material magazine 14, there is arranged a material receiving magazine 106, in which the image receiving material 108 is housed, being wound in a rolled form. A pigment fixing material having a mordant is applied on the image forming surface of the image receiving material 108, and this image forming surface is taken up, facing the upper side of the device.

As in the case of the photosensitive material magazine 14, the material receiving magazine 106 is composed of a body part and a pair of side frame parts fixed in both ends of this body part. The magazine 106 can be pulled to the front side of the machine base 12 (to the front side of the page of FIG. 1, that is to say, in the width direction of the taken up image receiving material 108).

A nip roller 110 is arranged in the vicinity of the image receiving material take-out port of the material receiving magazine 106. The image receiving material 108 can be pulled out of the material receiving magazine 106 and the nip roller can be released. A cutter 112 is arranged in the side of the nip roller 110.

In the side of the cutter 112, there is provided an image receiving material carrying part 180, which is positioned in the side of the photosensitive material magazine 14. Carrier rollers 186, 190 and 114 and a guiding plate 182 are arranged in the image receiving material carrying part 180, and the image receiving material 108 cut to a specified length can be carried to the heat developable transferring part 104.

The photosensitive material 16 carried to the heat developable transferring part 104 is fed between a sticking roller 120 and a heating drum 116. The image receiving material 108 is fed between the sticking roller 120 and the heating drum 116 in synchronization with carrying of the photosensitive material 16, which precedes by a specified length. The material 108 is thereby laid over the material 16. A pair of halogen lamps 132A and 132B are arranged inside the heating drum 116, and the temperature of the surface of the heating drum 116 can be increased.

Referring to FIG. 21, an endless press-contact belt 118 is wound on five winding rollers 134, 135, 136, 138 and 140, and an endless external side between the winding rollers 134 and 140 is in contact by pressure with the outer periphery of the heating drum 116.

Figure 20:
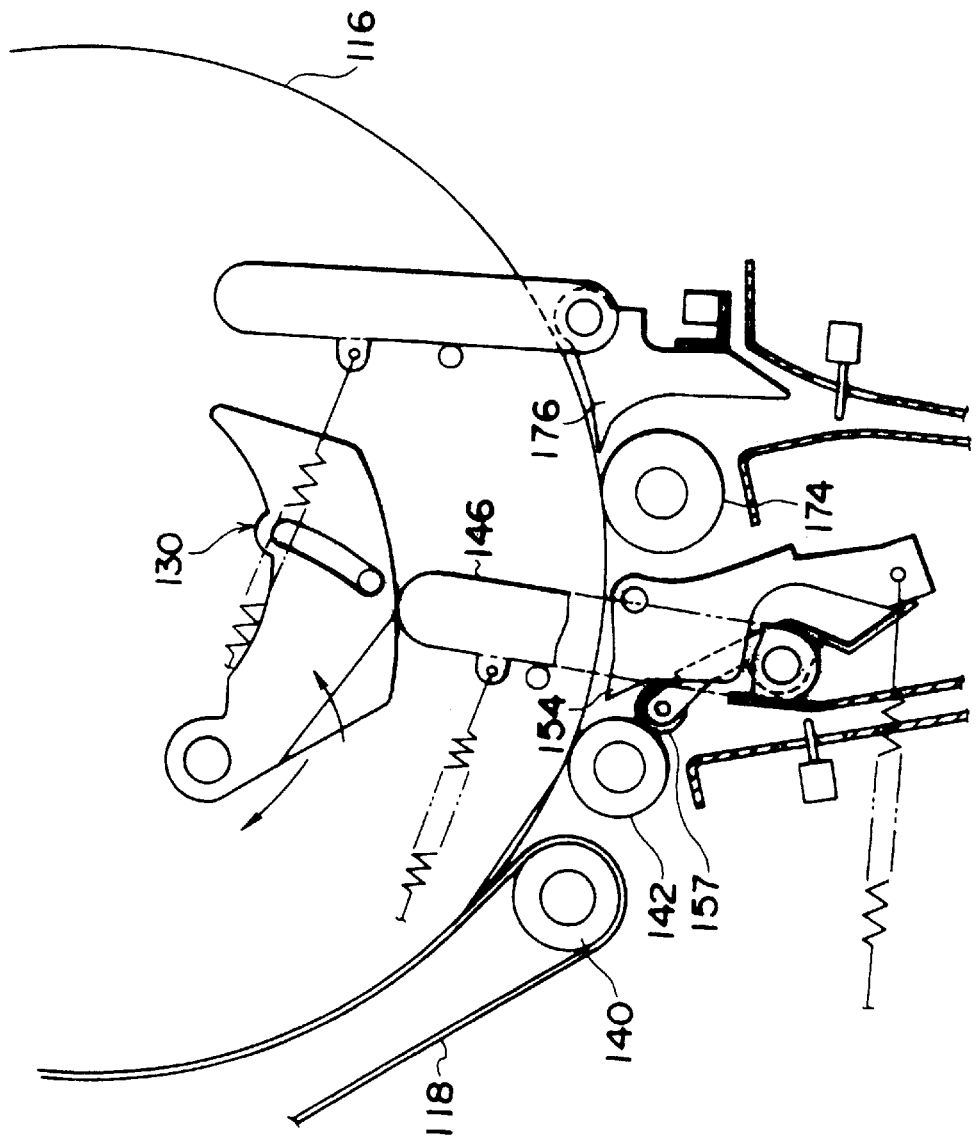
FIG. 20 is an enlarged constitutional view in the vicinity of the lower end portion of a heating drum.

Referring to FIGS. 1 and 20, a bending guide roller 142 is arranged in the lower part of the heating drum 116, which is located in the material feeding direction downstream side of the endless press-contact belt 118. A peeling pawl 154 is provided so as to rotate around a specified shaft in the lower part of the heating drum 116, which is located in the material feeding direction downstream side of the bending guide roller 142. This pawl 154 is brought close to the outer periphery of the heating drum 116 by a cam 130 so as to peel off the photosensitive material 16.

The photosensitive material 16 peeled off by the peeling pawl 154 is wound on the bending guide roller 142, moved in a lower direction, and carried through carrier rollers 158, 162 and 160 to a waste photosensitive material housing box 178.

A peeling roller 174 and a peeling pawl 176 are arranged in the vicinity of the heating drum 116 in the side of the bending guide roller 142. A material receiving guide 170 is arranged in the lower side of the peeling roller 174 and the peeling pawl 176 and received material discharging rollers 172 and 173 are also provided. The image receiving material 108 peeled off from the heating drum 116 can be guided and carried by the peeling roller 174 and the peeling pawl 176.

The image receiving material 108 peeled off from the outer periphery of the heating drum 116 by the peeling pawl 176 is carried by the material receiving guide 170 and the received material discharging rollers 172, 173 and 175 and discharged to a tray 177.

Next, explanation will be made in detail of the functions of the controller 100, which are substituted for the function for moving image formation spots on the surface of the photosensitive material 16 at equal speeds and an achromatizing function.

First, the function for keeping image formation spots on the photosensitive material 16 surface at equal intervals (hereinafter referred to as a function for maintaining fθ capability) will be described in connection with the control of the emission timing of one light beam.

Figures 5A, 5B:
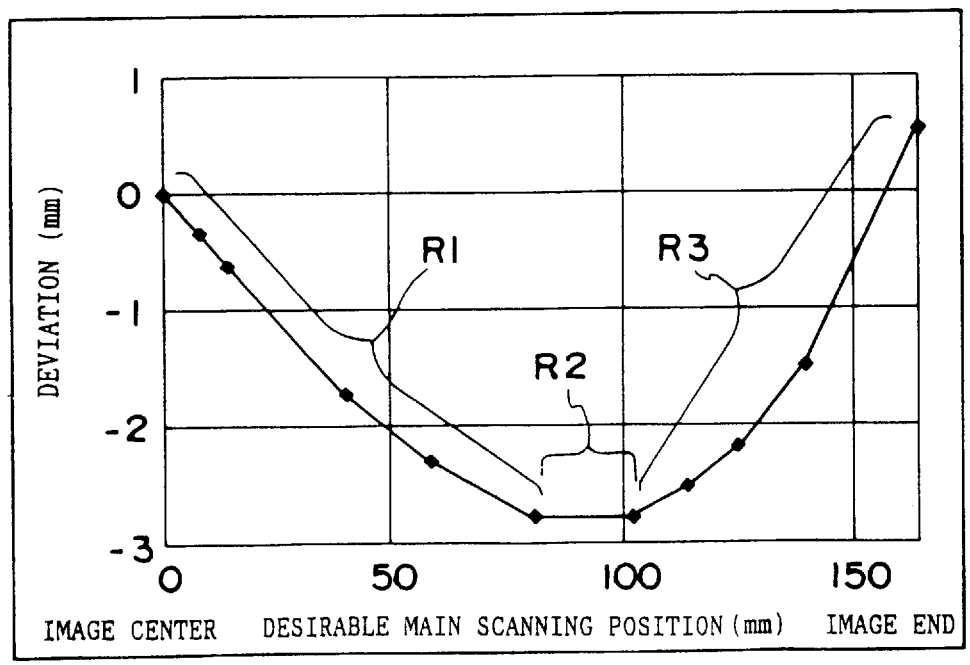
FIG. 5A is a table showing scanning positions and deviations from the positions which should be normally present.
FIG. 5B is a diagram in which the information shown in FIG. 5A is represented by a graph.

FIGS. 5A and 5B are diagrams, each of which illustrates a relationship between a scanning position and "a deviated amount from an original spot" (hereinafter referred to as a distance to be corrected) for maintaining equal intervals between image formation spots on the photosensitive material 16 surface, when the image surface position correcting lens 270 installed in the exposure device 38 is utilized. Herein, a deviated amount is positive when a spot is shifted from the original spot to an image end side.

As apparent from the diagram of FIG. 5B, a spot is shifted from the original spot toward the image center side in the region R1 of the image center side, and its deviated amount gradually increases. A deviated amount toward the image center side is largest in a region R2 in the vicinity of a center between the image center and the image end, but there are almost no fluctuations in deviation. A spot is still shifted toward the image center side in the region R3 of the image end side. But its deviated amount gradually decreases in this case.

Therefore, in order to maintain equal intervals between image formation spots on the photosensitive material 16 surface, it is necessary to make corrections so as to set larger intervals between image formation spots in the region R1, make no corrections for intervals between image formation spots in the region R2 and make corrections so as to set smaller intervals between image formation spots in the region R3.

On the other hand, the controller 100 has a built-in clock oscillator for oscillating a clock having a fixed frequency. Based on a clock count in the clock oscillated by the clock oscillator, the controller 100 causes a light beam to be emitted normally once per 8 clocks, and once per 9 clocks or once per 7 clocks once in a while.

Figure 6:
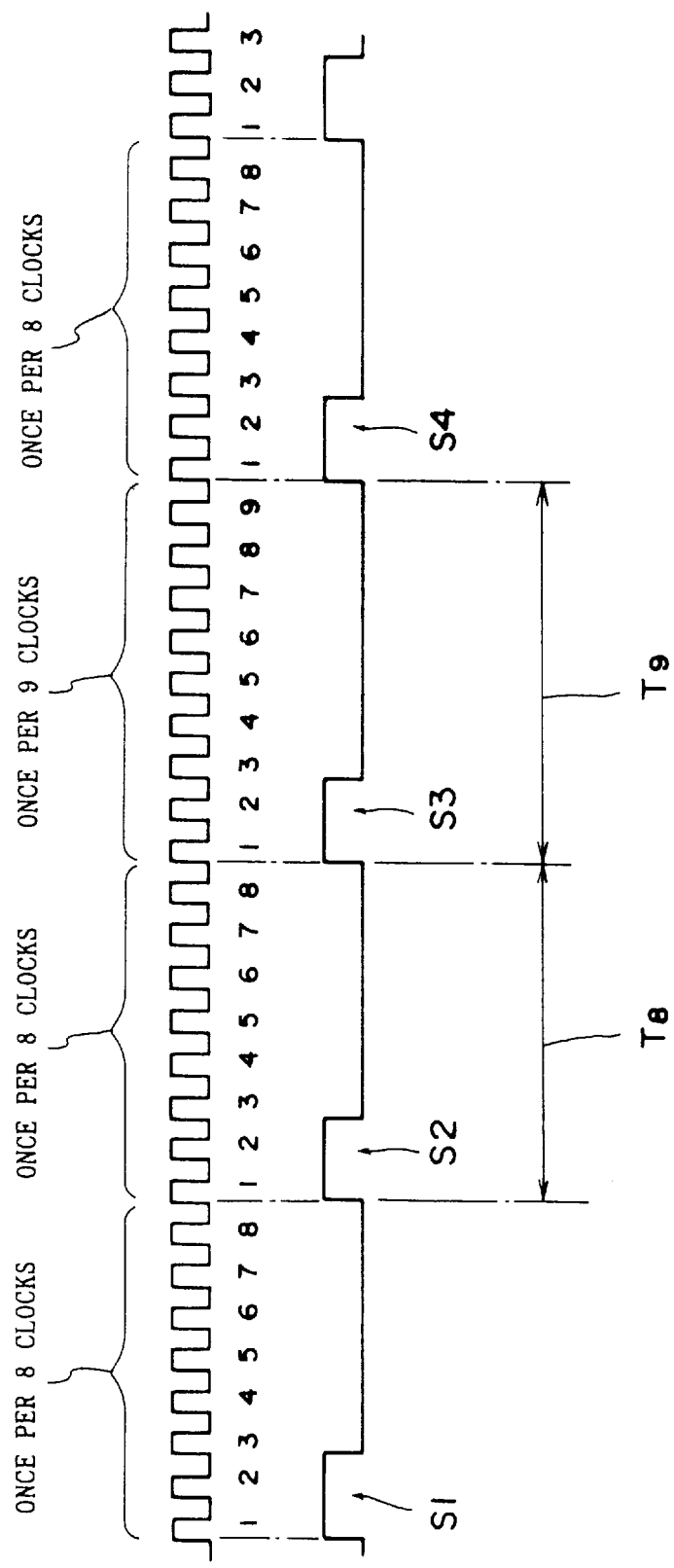
FIG. 6 is a time chart showing a correspondence of the clock in a "Introduce 9/8" compensation pattern to the radiation timing of a light beam.

As an example, the time chart of FIG. 6 illustrates a case, in which a light beam is caused to be emitted once per 8 clocks as indicated by arrows S1, S2 and S4 and once per 9 clocks as indicated by an arrow S3. In this example, emitting of a light beam is started at the first clock rising time of 8 clocks and alternatively 9 clocks. However, starting of a light beam emission at the first clock rising time is not an essential condition, and thus emission of a light beam may be started by a predetermined timing in the specified number of clocks. For example, as shown in FIG. 7, when a light beam is emitted once per 9 clocks, the interval L34 of an image formation spot P3 with a succeeding image formation spot P4 is slightly larger than a normal interval (interval L12 and alternatively L23 between image formation spots when a light beam is emitted once per 8 clocks).

Figure 8:
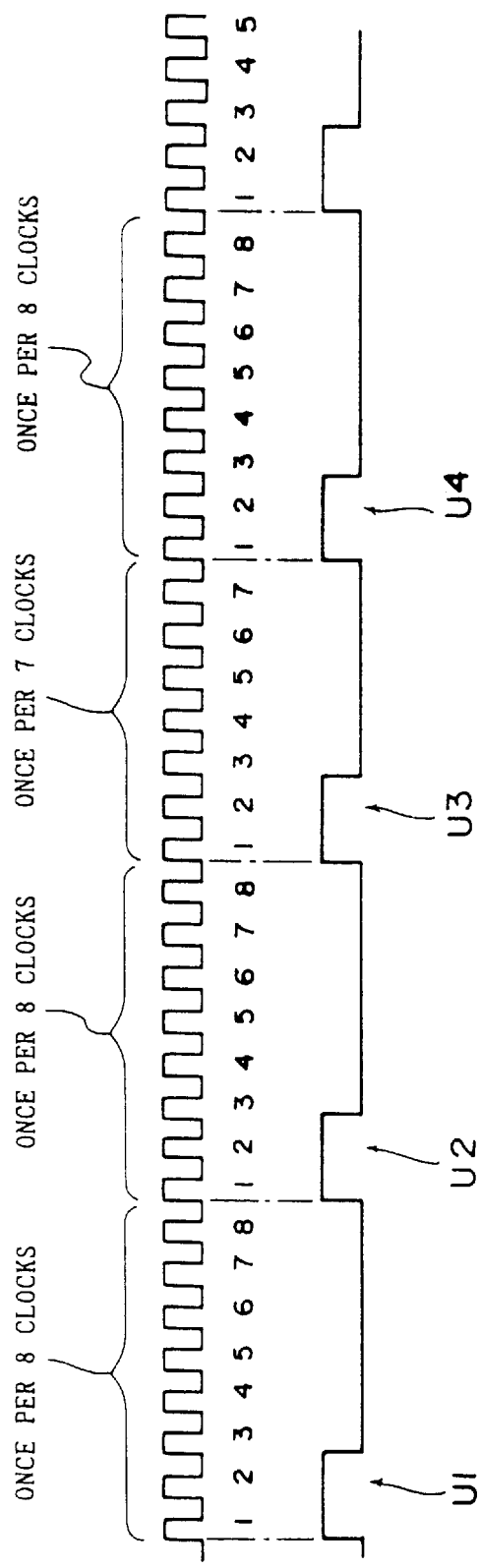
FIG. 8 is a time chart showing a correspondence of the clock in a "Introduce 7/8" compensation pattern to the radiation timing of the light beam.
Figure 9:
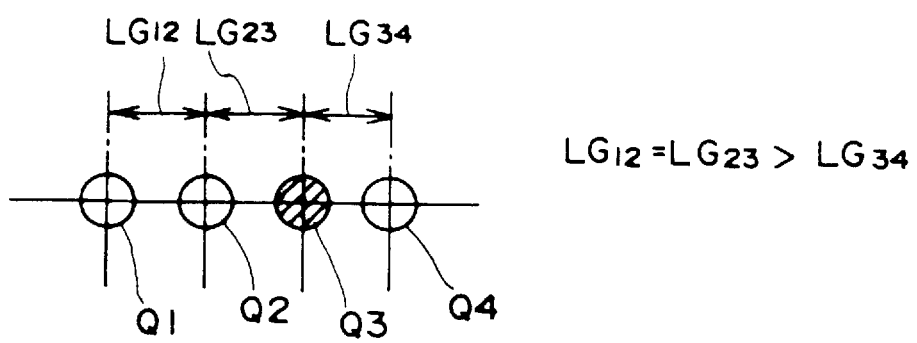
FIG. 9 is an illustrative view of a difference of intervals between image formation spots by the "Introduce 7/8" compensation.

The time chart of FIG. 8 illustrates a case, in which a light beam is emitted once per 8 clocks as indicated by arrows U1, U2 and U4 and once per 7 clocks as indicated by an arrow U3. In this example, emission of a light beam is started at the first clock rising time of 8 and alternatively 7 clocks. For example, as shown in FIG. 9, when a light beam is emitted once per 7 clocks, the interval $LG_{34}$ of an image formation spot Q3 with a succeeding image formation spot Q4 is slightly smaller than a normal interval (interval $LG_{12}$ and alternatively $LG_{23}$ when a light beam is emitted once per 8 clocks).

In the first embodiment, control is performed in such a manner that by utilizing the foregoing correcting method of image formation spot intervals, a light beam is emitted normally once per 8 clocks and once per 9 clocks once in a while in the region R1 of FIG. 5B, in which corrections should be made to set larger the intervals between image formation spots as described above; and a light beam is emitted normally once per 8 clocks and once per 7 clocks once in a while in the region R3 of FIG. 5B, in which corrections should be made to set smaller the intervals between image formation spots.

In the foregoing relationship between a scanning position and a correction distance corresponding to the scanning position, as apparent from the diagram of FIG. 5B, the correction distance fluctuates according to the scanning position. This means that in a region in which a fluctuation in the correction distance is large, it is necessary to increase the degree of correction by frequently making corrections depending on large fluctuations in the correction distance.

Therefore, in the first embodiment, as shown by the table of FIG. 10, the regions R1 and R3 of FIG. 5B are respectively divided into 5 and 4, and therefore, totally 10 divided regions are provided including the region R2. The frequency of corrections in each divided region is preset according to the degree of fluctuations in the correction distance. Information regarding the frequency of corrections for each of these divided regions is stored in ROM beforehand. The method of dividing the regions is not limited to the foregoing. In order to make most accurate corrections, it is preferred to make corrections when the correction distance fluctuates one count, instead of divisions.

"Introduce 9/8" in the table means that control is performed so as to emit a light beam normally once per 8 clocks and once per 9 clocks at the described frequency. The correction of this "Introduce 9/8" enables the interval of a light beam emission timing to be long, which in turn makes it possible to make corrections so as to set larger the intervals between light beam image formation spots.

On the other hand, "Introduce 7/8" means that control is performed so as to emit a light beam normally once per 8 clocks and once per 7 clocks at the described frequency. The correction of this "Introduce 7/8" enables the interval of a light beam emission timing to be short, which in turn makes it possible to make corrections so as to set smaller the intervals between light beam image formation spots.

That is to say, in the first embodiment, according to the correction patterns shown in FIG. 10, corrections are made so as to set larger the intervals between image formation spots in the region R1 and smaller the intervals in the region R3. Then, by increasing the frequency of corrections in the divided region, in which a fluctuation degree is larger in the correction distance, a light beam emission timing is properly corrected for each divided region, thereby setting equal the intervals between light beam image formation spots in the main scanning direction.

Next, the function for moving image formation spots at equal intervals among colors will be described.

Even if corrections are made to set equal the intervals between light beam image formation spots for each light beam, this does not necessarily mean that these intervals coincide with one another among light beams. Therefore, the emission timing of each semiconductor laser 258x is controlled such that these intervals coincide with one another among light beams.

In this condition, although the intervals between image formation spots for each light beam coincide with one another among light beams, the positions of the image formation spots in the respective light beams are not in agreement with one another in the main scanning direction. In the first embodiment, positional shifts between the image formation spots of the respective light beams in the main scanning direction are corrected by adjusting the emission timing of each semiconductor laser 258x at the time of starting scanning. Specifically, in order that the positions of image formation spots in the respective light beams may coincide with one another on the scanned surface in the main scanning direction, after the SOS sensor 276 receives a light beam from each semiconductor laser 258x, an adjustment is made of a timing for outputting a start signal from the SOS sensor 276 for each semiconductor laser 258x, the signal being used for obtaining a timing for emitting a light beam from each semiconductor laser 258x.

An actual difference between correction distances in the respective light beams is very small. Thus, setting of divided regions, correction contents and a frequency may be performed beforehand for the emission timing of one semiconductor laser, and for the emission timings of the other semiconductor lasers, setting may be performed by correcting the correction contents and frequency set beforehand for the one semiconductor laser.

Next, the action of the first embodiment will be described.

When the operator specifies image data to be exposed and instructs starting of specified exposure through the operation part 103 with the photosensitive magazine 14 and the material receiving magazine 106 loaded, exposure processing is executed under the control of the controller 100 in a manner as follows.

First, the nip roller 18 shown in FIG. 1 is actuated, thereby pulling out the photosensitive material 16. After the photosensitive material 16 has been pulled out by a specified length, the cutter 20 is actuated, thereby cutting the photosensitive material 16 to a specified length.

After the cutter 20 has been actuated, the photosensitive material 16 is inverted and carried to the exposing part 22 with its photosensitive (exposed) surface facing upward. During carrying of this photosensitive material 16, the controller 100 shown in FIG. 3 reads the specified image data from the image memory 102. The controller 100 then controls currents supplied to the semiconductor lasers 258C, 258M and 258Y so as to cause a light beam for developing each of Y, M and C colors based on the image data to be emitted at the preset emission timing, duration and light intensity as described above.

Here, corrections are made for the emission timing of each color light beam according to a scanning position based on a correction pattern set for each color like that shown in the table of FIG. 10. Therefore, intervals between image formation spots for each color light beam coincide with one another among light beams and fθ capability is maintained.

Light beams from the semiconductor lasers 258Y, 258M and 258C are made incident on the collimator lens 260. The light beams converted into parallel light beams by the collimator lens 260 are converged by the cylindrical lens 263 on the reflection area 268 of the polygon mirror 264 in the auxiliary scanning direction.

On the other hand, the polygon mirror 264 rotates around the shaft 266 at a high speed. By means of the rotation of this polygon mirror 264, the light beams are deflected in the main scanning direction indicated by an arrow A of FIG. 4. While being deflected in the main scanning direction, the light beams are made incident on the image surface position correcting lens 270. FIG. 3 shows an optical axis center C with respect to the light beam, and the start and end positions S and E of deflection in the main scanning direction (main scanning).

The light beams transmitted through the image surface position correcting lens 270 are shaped in the auxiliary scanning direction by the cylindrical lens 269, then reflected by the cylindrical mirror 272 and further reflected approximately vertically in a downward direction by the reflection mirror 274, reaching the photosensitive material 16.

In this connection, the controller 100 performs control by using the foregoing electrical control method such that intervals are set equal between image formation spots for each light beam on the photosensitive material 16.surface and image formation spot intervals in the respective light beams coincide with one another among light beams.

Furthermore, the controller 100 controls a main scanning starting time for each light beam, that is to say, an emission start timing for a light beam from each semiconductor laser 258x, such that first image formation spot positions coincide with one another on the photosensitive material 16 surface among light beams during one scanning.

From the foregoing, it is apparent that image formation spot positions coincide with one another among light beams on the photosensitive material 16 surface both in the main and auxiliary scanning directions. Actually, in the exposure device 38, the image formation spots of light beams never come to the same position in the main scanning direction simultaneously due to a difference in the incident angles of the light beams to the polygon mirror 164. However, the emission timing of each light beam is controlled in order that first image formation spot positions may coincide with one another in the main scanning direction among light beams as described above, and thereby each light beam is focused in the same position on the photosensitive material 16 surface.

Consequently, images targeted for exposure are exposed in a spot, in which a light beam for developing yellow, a light beam for developing magenta and a light beam for developing cyan are converged.

Because of the rotation of the polygon mirror 264 as described above, main scanning in the main scanning direction is repeated for the image formation spot. In parallel with this, the photosensitive material 16 is carried in the auxiliary scanning direction (auxiliarily scanned). This results in exposing of images to light beams from the semiconductor lasers 258C, 258M and 158Y on the photosensitive material 16.

Immediately after such exposure, the photosensitive material 16 is temporarily sent to the switch back part 40, and then sent to the water applying part 62 by means of the reverse rotation of the carrier roller 26.

In the water applying part 62, water is applied to the photosensitive material 16, and this passes through the water applying part 62 while excess water is eliminated by the squeezing roller 68. The photosensitive material 16, to which water as an image forming solvent has been applied in the water applying part 62, is sent into the heat developable transferring part 104 by the squeezing roller 68.

On the other hand, following the start of exposure on the photosensitive material 16, the nip roller 110 is drive-controlled by the controller 100, thereby pulling the image receiving material out of the material receiving magazine 106. After the image receiving material 108 has been pulled out by a specified length, the cutter 112 is actuated, thereby cutting the image receiving material 108 to a specified length.

After the actuation of the cutter 112, the image receiving material 108 is carried by the carrier rollers 190, 186 and 114 while being guided by the guiding plate 182, and placed on standby immediately before the heat developable transferring part 104.

In the heat developable transferring part 104, when feeding of the photosensitive material 16 between the outer periphery of the heating drum 116 and the sticking roller 120 is detected, carrying of the image receiving material 108 is resumed and then sent to the sticking roller 120, and the heating drum 116 is actuated.

In this case, since there is arranged a guiding plate 122 between this sticking roller 120 and the squeezing roller 68 of the water applying part 62, the photosensitive material 16 sent from the squeezing roller 68 is surely guided to the sticking roller 120.

The photosensitive material 16 and the image receiving material 108 laid over the other are held between the heating drum 116 and the endless press-contact belt 118 in this condition and carried anticlockwise by nearly ⅔ of one round of the heating drum 116 (between the winding rollers 134 and 140) in FIG. 1. This results in heating of the photosensitive material 16 and the image receiving material 108 and discharging of a movable pigment. This pigment is transferred to the pigment fixing layer of the image receiving material 108, thereby recording an image in the image receiving material 108.

Then, after the photosensitive material 16 and the image receiving material 108 have been carried in a sandwiched manner and reached the lower part of the heating drum 116, the peeling pawl 154 is moved up to the heating drum 116 by the cam 130 and engaged with the tip part of the photosensitive material 16, which is carried, preceding the image receiving material 108 by a specified length. Thereby, the tip part of the photosensitive material 16 is peeled off from the outer periphery of the heating drum 116. Then, the return movement of the peeling pawl 154 causes a pinch roller (see FIG. 20) to press the photosensitive material 16. Consequently, the photosensitive material 16 is wound on the bending guide roller 142 and moved downward, and further carried to the waste photosensitive material housing box 178 by the carrier rollers 158, 162 and 160.

On the other hand, the image receiving material 108 separated from the photosensitive material 16 and moved being closely adhered to the heating drum 116 is sent to the peeling roller 174 and peeled off from the outer periphery of the heating drum 116 by the peeling pawl 176.

The image receiving material 108 is moved downward, being wound on the peeling roller 174, then carried by the receiving material discharging rollers 172, 173 and 175 while being guided by the receiving material guide 170 and discharged to the tray 177.

In the foregoing manner, an image to be recorded is first exposed on the photosensitive material 16 and then thermally transferred to the image receiving material 108. The image receiving material 108 with the recorded image is discharged to the tray 177, becoming available.

To sum up, according to the first embodiment, since the image surface position correcting lens 270 is not equipped with the functions for moving the image formation spots by the deflected light beam at equal intervals on the photosensitive material 16 surface and moving these at equal intervals among colors and these are, rather, realized by the electrical control method of the controller 100, it is possible to reduce costs by simplifying the structure of the lens and easily carry out device assembling work.

Embodiment 2

A second embodiment will now be described, in which fθ capability is maintained by changing a clock frequency according to a scanning position while keeping a clock count constant.

The configuration of an image recording device 10 in Embodiment 2 is approximately the same as that of the image recording device 10 in the first embodiment, and thus its explanation will be omitted.

FIG. 13 shows the loci of light beams deflected by the polygon mirror 264 and the positions of image formation spots on the photosensitive material 16. When main scanning is performed from a scanning center C in the direction of an arrow J, without any corrections made, intervals between image formation spots at specified time intervals gradually increase as shown by the spots C, B0 and A0 as these move further away from the scanning center. Therefore, it is necessary to make shorter an emission time interval for a light beam as the spot moves further away from the scanning center.

Thus, in Embodiment 2, in order to make shorter the emission time interval of a light beam as a spot moves further away from the scanning center, control is performed so as to emit a light beam at a fixed clock number (e.g. 8 clocks) and a clock frequency is increased as the spot moves further away from the scanning center. Specifically, a clock frequency in a position targeted for correction is set such that a clock frequency ratio between the image center C and the position targeted for correction is equal to that of a scanning speed before correction.

For example, referring to FIG. 13, it is assumed that a clock frequency in the spot C is ω0, a clock frequency is ω1 in a timing for forming an image in the spot B0 when no corrections are made and a clock frequency is ω2 in a timing for forming an image in the spot A0. It is similarly assumed that a scanning speed is V0 in the spot C, a scanning speed is V1 in a timing for forming an image in the spot B0 when no corrections are made and a scanning speed is V2 in a timing for forming an image in the spot A0.

Now, in order to maintain the fθ capability, ω1 is calculated based on an expression (5), which is derived from an expression (4) below.

$$(\omega 1/\omega 0)=(V1/V0) \qquad (4)$$

$$\omega 1=\omega 0 \times (V1/V0) \qquad (5)$$

Also, ω2 is calculated based on an expression (7), which is derived from an expression (6) below.

$$(\omega 2/\omega 0)=(V2/V0) \qquad (6)$$

$$\omega 2=\omega 0 \times (V2/V0) \qquad (7)$$

By these expressions, the clock frequency ω1 in the timing for forming an image in the spot B0 and the clock frequency ω2 in the timing for forming an image in the spot A0 can be calculated.

By changing a clock frequency in an optional scanning position according to a scanning speed when no corrections are made in the scanning position as in the foregoing manner, a function for moving image formation spots at equal intervals on the photosensitive material 16 can be successfully realized.

In actuality, it is difficult to set clock frequencies for all the pixels and change these clock frequencies. Therefore, as in the case of the correction patterns of the first embodiment, a scanning range is divided into the specified number of regions and an optimal clock frequency for each region is set beforehand. Then, based on this setting, a clock frequency is changed.

The foregoing frequency may be selected from frequency values preset in a plurality of stages according to a scanning position, and alternatively corrections may be made so as to move image formation spots at equal intervals by combining all the frequency values of the plurality of stages.

Needless to say, it is preferred that in order to improve accuracy for corrections, a scanning range is divided into a greater number of regions and a clock frequency is set beforehand for each of these divided regions. A method of making most accurate corrections is to set a frequency for each pixel beforehand and change the frequency while scanning.

Embodiment 3

Embodiment 3 will now be described, in which alignment in an auxiliary scanning direction of image formation spots to be corrected for respective main scanning lines and visibility of exposing irregularity are prevented.

The configuration of an image recording device 10 in Embodiment 3 is the same as that of the image recording device 10 in Embodiment 1, and thus its explanation will be omitted.

Figure 15:
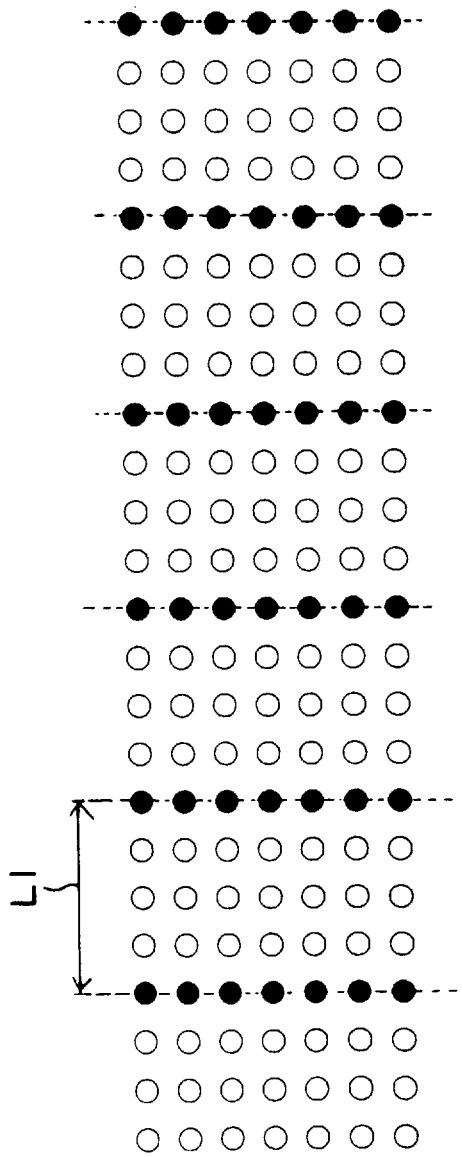
FIG. 15 shows the position of the corrected image formation spots in the case that the positions of the corrected image formation spots are arranged in an auxiliary scanning direction.

As described in the section of Summary of the Invention, referring to FIG. 15, when image formation spots to be corrected for respective main scanning lines are aligned in the auxiliary scanning direction, exposing irregularity occurs on the photosensitive material 16 in a line along the auxiliary scanning direction, in which the image formation spots have been aligned, and this may become visible.

There is known an experiment, the result of which shows that visibility is reduced as an interval between lines in the corrected image formation spots aligned in the same direction (hereinafter referred to as corrected image formation spot lines) is smaller (explained later by referring to the diagram of FIG. 22).

Figure 16:
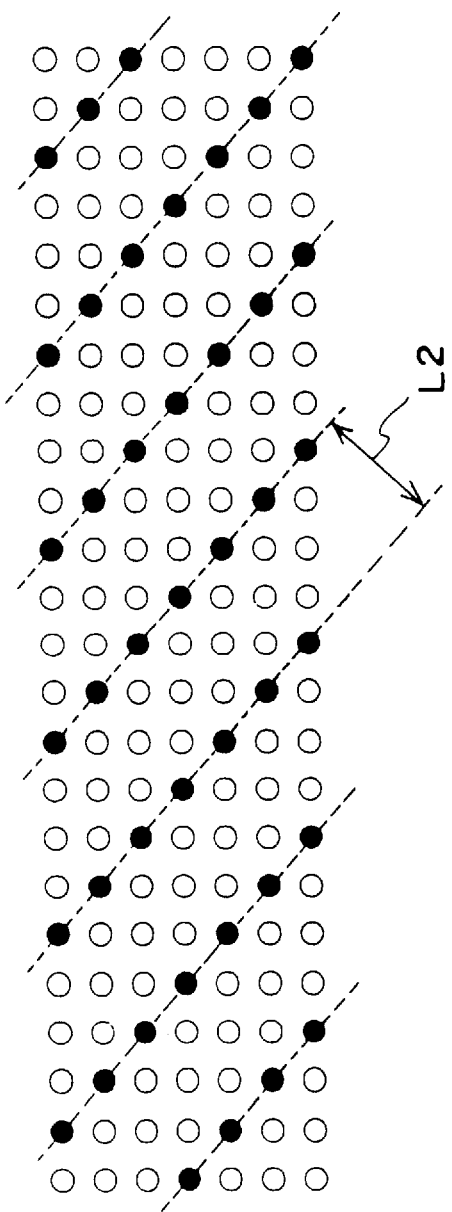
FIG. 16 shows the position of the corrected image formation spots in the case that the corrected image formation spots in adjacent main scanning lines are shifted one pixel by one pixel in the main scanning direction.

Thus, in the third embodiment, a correction pattern (see FIG. 10) for a light beam emission timing according to a scanning position along one main scanning line is set beforehand, and in order to prevent visibility of exposing irregularity on the photosensitive material 16 as described above while maintaining such a correction pattern for each main scanning line, the positions of image formation spots to be corrected are shifted in the main scanning direction each by a specified distance, for instance like that shown in FIG. 16.

This results in oblique formation of corrected image formation spot lines, and a corrected image formation spot line interval L2 in FIG. 16 is smaller than a corrected image formation spot line interval L1 in FIG. 15.

By shifting the positions of corrected image formation spots each by a specified distance as in the foregoing manner, an interval between corrected image formation spot lines is made smaller so as to reduce visibility, thereby making it possible to prevent visibility of exposing irregularity on the photosensitive material 16.

Figures 17A, 17B:
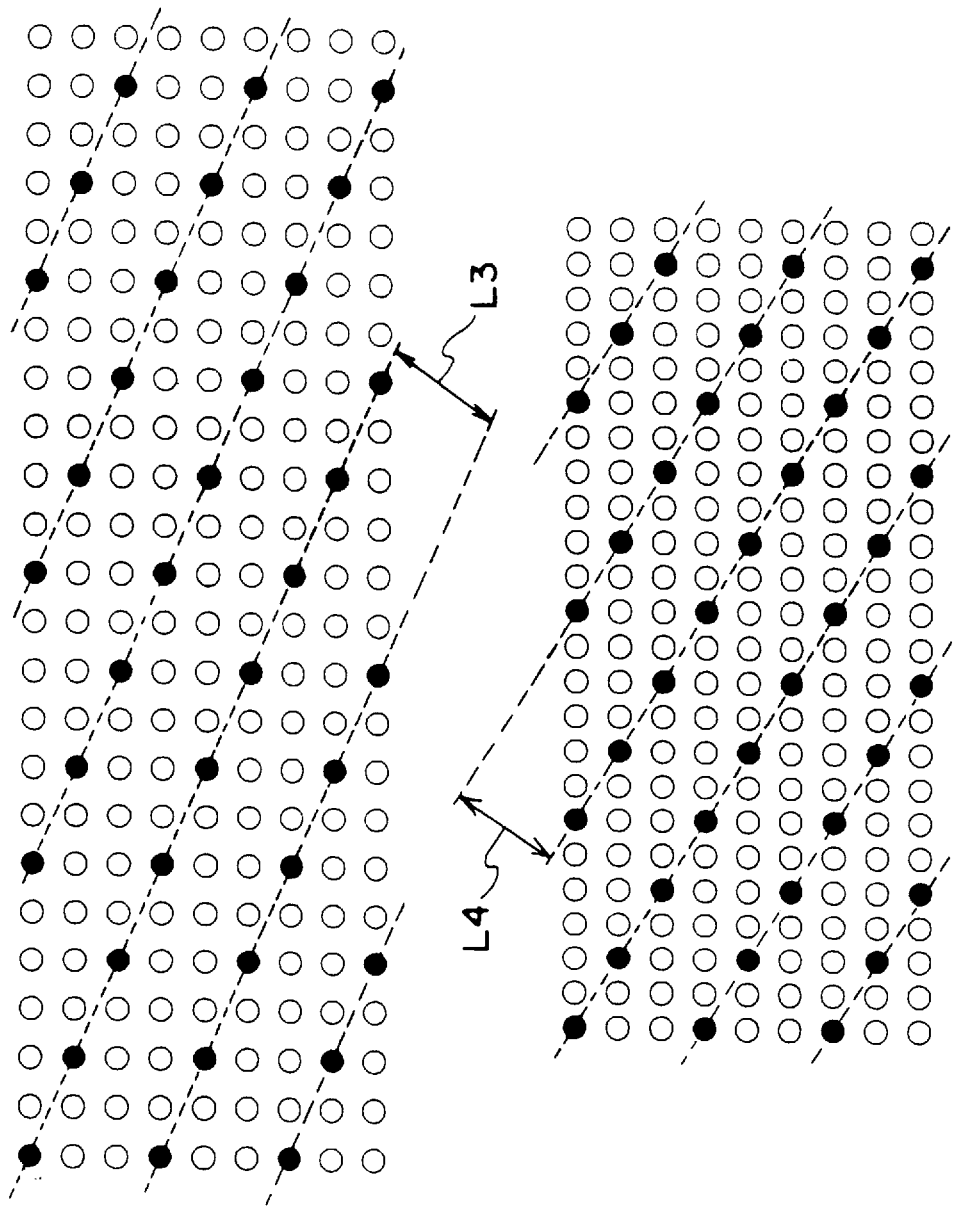
FIG. 17A shows the position of the corrected image formation spots in the case that the corrected image formation spots in the adjacent main scanning lines are shifted two pixels by two pixels in the main scanning direction.
FIG. 17B shows the position of the corrected image formation spots in the case that a clock frequency is higher than in FIG. 17A.

Regarding a distance, by which the position of a corrected image formation spot is shifted in the main scanning direction, it may be equivalent to one pixel like an example shown in FIG. 16, and alternatively two pixels like an example shown in FIG. 17A. Needless to say, it may be equivalent to three pixels and more.

When a correction pattern (correction content and frequency) is changed according to a scanning position as shown in FIG. 10, the inclined angle of a corrected image formation spot line, described below, may be changed according to the correction pattern. The inclined angle of a corrected image formation spot line means a small angle out of angles formed between the main scanning line and corrected image formation spot lines.

FIG. 10 shows an example of changing the inclined angle of a corrected image formation spot line according to the correction pattern. As apparent from the drawing, in the case of a pattern of "Introduce 9/8 once per 6 pixels" and alternatively "Introduce 7/8 once per 6 pixels", it is necessary to set the inclined angle of a corrected image formation spot line to "14.0 degree" since the degree of correction is smaller than in the other correction patterns shown in FIG. 10. In the case of the other patterns, the inclined angles of corrected image formation spot lines are set to "26.6 degree".

Figure 18:
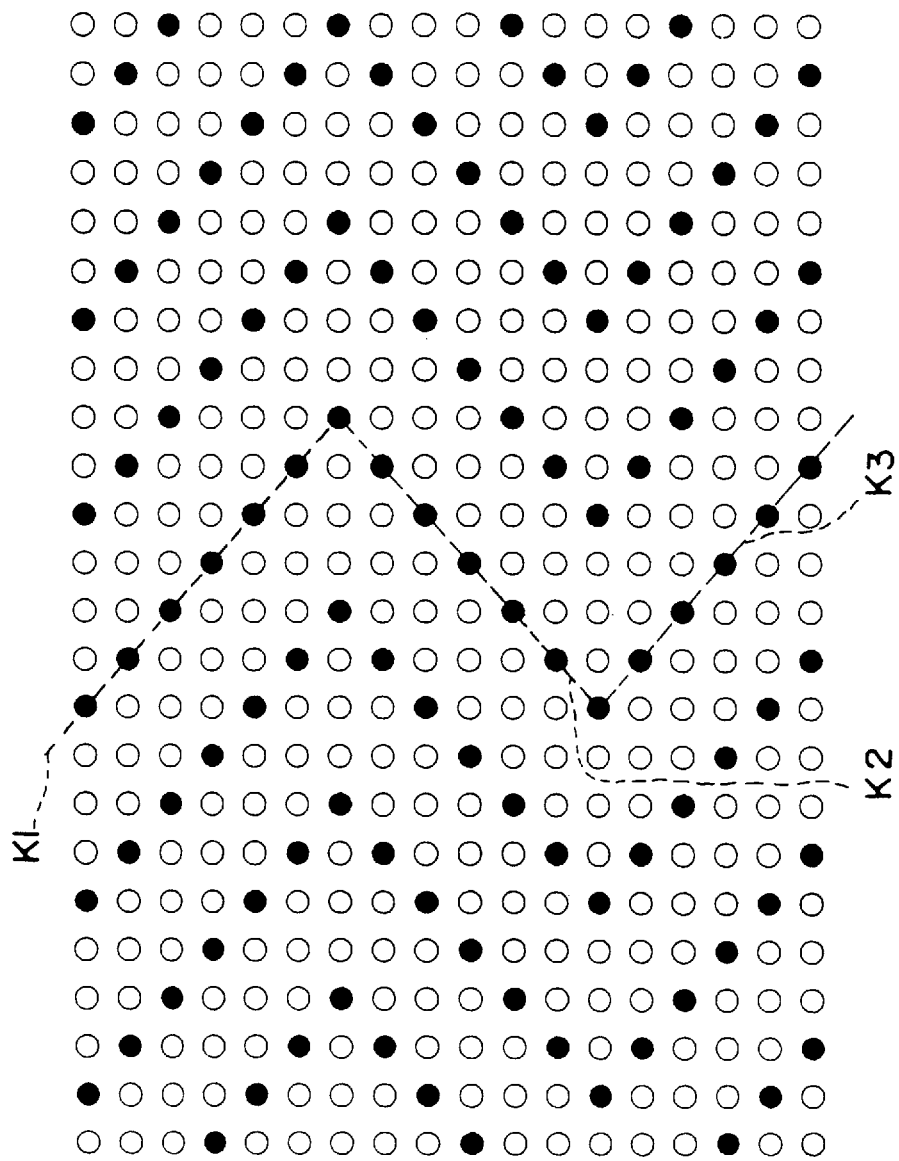
FIG. 18 shows the position of the corrected image formation spots in the case that the corrected image lines are constituted of a plurality of lines along mutually different directions.

A corrected image formation spot line may be a line along a fixed direction (herein, a right downward direction) like that shown in FIG. 16. Alternatively, this may be a line constituted of a plurality of lines along different directions like that shown in FIG. 18 (in FIG. 18, a line constituted of lines K1 and K3 along right downward directions and a line K2 along a left downward direction).

As described above, visibility is reduced as an interval between corrected image formation spot lines is smaller. Consequently, an interval between corrected image formation spot lines is smaller in the case of shifting by two pixels like the example of FIG. 17A than in the case of shifting by one pixel like the example of FIG. 16 (i.e., interval L2>interval L3). This means that in the case of shifting by two pixels like the example of FIG. 17A, visibility of exposing irregularity can be reduced more.

In the case of shifting by two pixels like that shown in FIG. 17A, by setting a clock frequency higher so as to increase the emission frequencies of the light beams, all the intervals between image formation spots along the main scanning direction are narrowed like that shown in FIG. 17B. In this case, the interval L4 of a corrected image formation spot line is smaller than the interval L3 of FIG. 17A.

Figure 19:
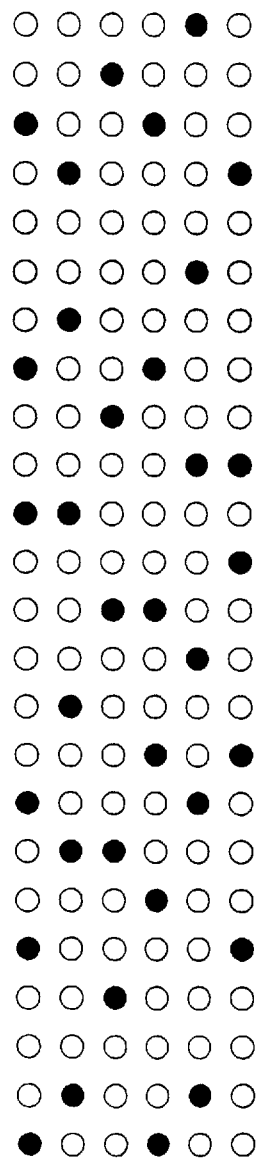
FIG. 19 shows the position of the corrected image formation spots in the case that the corrected image formation spots are arranged at random.

As shown in FIG. 19, by performing control so as to position corrected image formation spots for each main scanning line at random, it is possible to prevent visibility of exposing irregularity on the photosensitive material 16. However, even though the corrected image formation spots are arranged for each main scanning line at random, it is necessary to maintain a correction pattern for each region within the scanning range in order to sustain the fθ capability.

FIG. 22 shows a relationship between a space frequency of irregularity and a density difference in the border of visibility and invisibility. In the drawing, irregularity is visible in a region in the upper side of a curve Y.

As an example, when a correction of "Introduce 9/8 once per 4 pixels" is executed, since a cycle is 254 $\mu$m (=one pixel 63.5 $\mu$m×4), a space frequency of irregularity is represented by $\alpha 1=4$ lp/mm (=1/0.254). It is thus apparent that irregularity is visible at a density difference d1=0.02 and higher in the upper side of the curve Y of FIG. 22.

If a corrected image formation spot line is inclined by an inclining angle of 26.6 degrees, a space frequency of irregularity is $\alpha 2$ (=8.8 lp/mm) and visible at a density difference of d2=0.15 and higher.

That is to say, by inclining the corrected image formation spot line, the value of a density difference in the border of visibility and invisibility can be increased, making it difficult to view irregularity. From this, it can also be understood that inclining of the corrected image formation line is an effective method for making it difficult to view irregularity.

According to any one of the first, second and fourth aspects of the present invention, since control can be performed so as to keep equal intervals between image formation spots for light beams on the scanned surface, it is possible to reduce costs by simplifying the structure of the fθ lens and easily carry out assembling work.

Furthermore, according to the third aspect of the invention, it is possible to properly change a clock frequency in accordance with a scanning position.

Furthermore, according to the fifth aspect of the invention, there can be obtained an effect that a count value can be properly corrected in accordance with a scanning position.

Furthermore, according to the sixth or the seventh aspect of the invention, there can be obtained an effect that it can be avoided by the utilization of a visual effect that a positional deviation at the frequency-corrected image formation spots is visually observed.

Furthermore, according to the eighth or the ninth aspect of the invention, there can be obtained an effect that it can be avoided by the utilization of a visual effect that a positional deviation at the count value-corrected image formation spots is visually observed.

Furthermore, according to the tenth aspect of the invention, the so-called fθ properties correction and the color compensation (the achromatization) can be simultaneously electrically accomplished by controlling the radiation timings of the respective light beams. Therefore, there can be obtained an effect that, in the scanner for scanning the surface to be scanned by the light beams having the different wavelengths radiated from the plurality of light sources, the structure of the fθ lens can be simplified to decrease a cost, and the installing operation of the fθ lens can easily be carried out.

Furthermore, according to the eleventh aspect of the invention, there can be obtained an effect that the positions of the image formation spots of the respective light beams on the surface to be scanned can coincide with one another in the main scanning direction.

While the embodiments of the present invention, as herein disclosed, constitute a preferred form, it is to be understood that other forms might be adopted.

What is claimed is:

1. A scanner for forming an image onto a recording medium, comprising:
    a light source for emitting light beams,
    main scanning means for scanning said light beams along said recording medium in a main scanning direction,
    an optical system for focusing on the recording medium the light beams,
    auxiliary scanning means for relatively moving said light beams across said recording medium in an auxiliary direction which is perpendicular to said main scanning direction, and
    light source control means for adjusting the timing of image spot formation on said recording medium to compensate for the different speed that the light beams traverse said recording medium in a single scan in said main scanning direction.

2. A scanner according to claim 1, wherein the light source control means has:
    clock generation means for generating a clock having a predetermined frequency,
    a predetermined count value set by the clock generation means,
    radiation control means for radiating the light beam from the light source every predetermined count value, and
    frequency control means for changing the frequency of the clock prior to the emission of each of said light beams.

3. A scanner according to claim 2, wherein the frequency control means alters the frequency of the clock based on a distance to be corrected between image spots formed on the recording medium by the light beams of the laser source so that the image spots are uniformly spaced on the recording medium in the main scanning direction.

4. A scanner according to claim 3, comprising a plurality of light sources, each of the plurality of light sources emitting respective light beams having different wavelengths, and
    wherein the light source control means controls radiation timings of the respective light beams so that the image spots formed on the recording medium corresponding to light beams emitted from any one of the light sources are arranged at equal intervals in the main scanning direction, and
    so that the image spots formed on the recording medium corresponding to light beams emitted from each of the light sources for each interval coincide.

5. A scanner according to claim 4, wherein the light source control means controls the radiation timings of the respective light beams so that the positions of the first image formation spots of the respective light beams in one main scanning of the recording medium coincide with one another in the main scanning direction.

6. A scanner according to claim 2, wherein image spots formed on the recording medium corresponding to a change in the frequency of the clock are designated as frequency-corrected image spots, and
    wherein the frequency control means changes the frequency of the clock so that the frequency-corrected image spots are not regularly aligned in the auxiliary scanning direction.

7. A scanner according to claim 6, wherein the frequency control means changes the frequency of the clock so that the frequency-corrected image spots are regularly aligned along lines inclined at an angle of 45° or more relative to the auxiliary scanning direction.

8. A scanner according to claim 6, comprising a plurality of light sources, each of the plurality of light sources emitting respective light beams having different wavelengths, and
    wherein the light source control means controls radiation timings of the respective light beams so that the image spots formed on the recording medium corresponding to light beams emitted from any one of the light sources are arranged at equal intervals in the main scanning direction, and
    so that the image spots formed on the recording medium corresponding to light beams emitted from each of the light sources for each interval coincide.

9. A scanner according to claim 8, wherein the light source control means controls the radiation timings of the respective light beams so that the positions of the first image formation spots of the respective light beams in one main scanning of the recording medium coincide with one another in the main scanning direction.

10. A scanner according to claim 2, comprising a plurality of light sources, each of the plurality of light sources emitting respective light beams having different wavelengths, and
    wherein the light source control means controls radiation timings of the respective light beams so that the image spots formed on the recording medium corresponding to light beams emitted from any one of the light sources are arranged at equal intervals in the main scanning direction, and
    so that the image spots formed on the recording medium corresponding to light beams emitted from each of the light sources for each interval coincide.

11. A scanner according to claim 10, wherein the light source control means controls the radiation timings of the respective light beams so that the positions of the first image formation spots of the respective light beams in one main scanning of the recording medium coincide with one another in the main scanning direction.

12. A scanner according to claim 1, wherein the light source control means has:

clock generation means for generating a clock having a predetermined frequency, a predetermined count value set by the clock generation means, radiation control means for radiating the light beam from the light source every predetermined count value, and count value correction means for changing the count value in the radiation control means prior to the emission of each of the light beams.

13. A scanner according to claim 12, wherein the count value correction means changes the count value based on a distance to be corrected between image spots formed on the recording medium by the light beams of the laser source so that the image spots are uniformly spaced on the recording medium in the main scanning direction.

14. A scanner according to claim 13, comprising a plurality of light sources, each of the plurality of light sources emitting respective light beams having different wavelengths, and wherein the light source control means controls radiation timings of the respective light beams so that the image spots formed on the recording medium corresponding to light beams emitted from any one of the light sources are arranged at equal intervals in the main scanning direction, and so that the image spots formed on the recording medium corresponding to light beams emitted from each of the light sources for each interval coincide.

15. A scanner according to claim 14, wherein the light source control means controls the radiation timings of the respective light beams so that the positions of the first image formation spots of the respective light beams in one main scanning of the recording medium coincide with one another in the main scanning direction.

16. A scanner according to claim 12, wherein image spots formed on the recording medium corresponding to a change in the predetermined count value of the clock are designated as frequency-corrected image spots, and wherein the count value correction means corrects the count value so that the count value-corrected image spots are not regularly aligned in the auxiliary scanning direction.

17. A scanner according to claim 16, wherein the count value correction means corrects the count value so that the count value-corrected image spots are regularly aligned along lines inclined at an angle of 45° or more relative to the auxiliary scanning direction.

18. A scanner according to claim 8, comprising a plurality of light sources, each of the plurality of light sources emitting respective light beams having different wavelengths, and wherein the light source control means controls radiation timings of the respective light beams so that the image spots formed on the recording medium corresponding to light beams emitted from any one of the light sources are arranged at equal intervals in the main scanning direction, and so that the image spots formed on the recording medium corresponding to light beams emitted from each of the light sources for each interval coincide.

19. A scanner according to claim 18, wherein the light source control means controls the radiation timings of the respective light beams so that the positions of the first image formation spots of the respective light beams in one main scanning of the recording medium coincide with one another in the main scanning direction.

20. A scanner according to claim 12, comprising a plurality of light sources, each of the plurality of light sources emitting respective light beams having different wavelengths, and wherein the light source control means controls radiation timings of the respective light beams so that the image spots formed on the recording medium corresponding to light beams emitted from any one of the light sources are arranged at equal intervals in the main scanning directions, and so that the image spots formed on the recording medium corresponding to light beams emitted from each of the light sources for each interval coincide.

21. A scanner according to claim 20, wherein the light source control means controls the radiation timings of the respective light beams so that the positions of the first image formation spots of the respective light beams in one main scanning of the recording medium coincide with one another in the main scanning direction.

22. A scanner according to claim 1, comprising a plurality of light sources, each of the plurality of light sources emitting respective light beams having different wavelengths, and wherein the light source control means controls radiation timings of the respective light beams so that the image spots formed on the recording medium corresponding to light beams emitted from any one of the light sources are arranged at equal intervals in the main scanning direction, and so that the image spots formed on the recording medium corresponding to light beams emitted from each of the light sources for each timing interval coincide.

23. A scanner according to claim 22, wherein the light source control means controls the radiation timings of the respective light beams so that the positions of the first image formation spots of the respective light beams in one main scanning of the recording medium coincide with one another in the main scanning direction.

* * * * *